(12) United States Patent
Sawai

(10) Patent No.: US 7,817,410 B2
(45) Date of Patent: Oct. 19, 2010

(54) DISPLAY SCREEN TURNING APPARATUS

(75) Inventor: Kunio Sawai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 34 days.

(21) Appl. No.: 12/027,685

(22) Filed: Feb. 7, 2008

(65) Prior Publication Data

US 2008/0192419 A1 Aug. 14, 2008

(30) Foreign Application Priority Data

Feb. 8, 2007 (JP) ............................... 2007-28693

(51) Int. Cl.
*H05K 7/14* (2006.01)
(52) U.S. Cl. ..................... 361/679.22; 361/679.21; 248/371; 16/54
(58) Field of Classification Search ............ 361/679.01, 361/679.21, 679.22, 679.26, 679.09, 679.02; 16/54, 386; 248/371, 133, 922, 923, 917–924
See application file for complete search history.

(56) References Cited

U.S. PATENT DOCUMENTS 6,804,861 B2 * 10/2004 Hsu .......................... 16/366
7,114,688 B2 10/2006 Rudolf
7,441,738 B2 * 10/2008 Kim ...................... 248/292.12
2007/0215760 A1 * 9/2007 Sawai et al. .............. 248/122.1

FOREIGN PATENT DOCUMENTS

| JP | 2001-146874 A | 5/2001 |
| JP | 3079007 U | 5/2001 |
| JP | 3092391 U | 12/2002 |
| JP | 2004-522918 A | 7/2004 |
| JP | 2006-64786 A | 3/2006 |

* cited by examiner

*Primary Examiner*—Jayprakash N Gandhi
*Assistant Examiner*—Ingrid Wright
(74) *Attorney, Agent, or Firm*—Crowell & Moring LLP

(57) ABSTRACT

A display screen turning apparatus includes a plate-shaped support shaft, a display screen support member, including a sectorial first hole, provided on the side of a display screen, serving as the rotation center, of the plate-shaped support shaft and a base support member, including a sectorial second hole, provided on the side of a base, while a first root portion of the sectorial first hole is arranged on the upper side of the first hole, a second root portion of the sectorial second hole is arranged on the lower side of the second hole, and a first side surface of the plate-shaped support shaft is inclined by a prescribed angle with respect to a vertical direction to come into contact with a first inner side edge of the sectorial second hole of the base support member when the display screen is vertically arranged with respect to a horizontal plane along with the display screen support member.

15 Claims, 24 Drawing Sheets

DISPLAY SCREEN TURNING APPARATUS

BACKGROUND OF THE INVENTION

1. Field of the Invention

The present invention relates to a display screen turning apparatus, and more particularly, it relates to a display screen turning apparatus comprising a display screen support member provided on the side of a display screen and a base support member provided on the side of a base.

2. Description of the Background Art

A display screen turning apparatus or the like for vertically or horizontally turning a display screen by a prescribed angle is known in general, as disclosed in each of Japanese Utility Model Registration Nos. 3079007 and 3092391, Japanese Patent Laying-Open No. 2001-146874, National Patent Publication Gazette No. 2004-522918 and Japanese Patent Laying-Open No. 2006-64786, for example.

The aforementioned Japanese Utility Model Registration No. 3079007 discloses a monitor positioner (display screen turning apparatus) comprising a fixed seat fixed onto a main seat (base) and provided with a figure-eight limiting hole on a surface arranged vertically from the main seat, a pivot (shaft) provided with a through-shaft axially extending from a first side surface of a pivot main body (round shaft) and having outer peripheral surfaces partially formed by planar portions parallel to each other and a fixed plate provided on a second side surface of the pivot main body (round shaft) for fixing a monitor, an oil-impregnated washer, an elastic plate and a nut. In this monitor positioner (display screen turning apparatus) described in Japanese Utility Model Registration No. 3079007, the through-shaft of the pivot is inserted into the figure-eight limiting hole of the fixed seat and clamped by the nut through the oil-impregnated washer and the elastic plate, to be rotatably supported in the figure-eight limiting hole. When the monitor is rotated frontward or rearward by a prescribed angle from a state perpendicularly arranged with respect to the main seat in this monitor positioner, the planar portions of the through-shaft of the pivot come into contact with the inner side surface of the figure-eight limiting hole, thereby regulating the rotational range of the monitor.

The aforementioned Japanese Utility Model Registration No. 3092391 discloses a video camera pan head comprising a pair of side plates, including arcuate slits having central points coinciding with the rotation center of a video camera, provided on both side surfaces of a root portion (base) and a vertical moving portion, held between the pair of side plates, having an arbor (shaft) movably fitted into the arcuate slits of the side plates. In this video camera pan head described in Japanese Utility Model Registration No. 3092391, gears are so rotationally driven as to move the arbor of the vertical moving portion along the slits of the side plates, thereby vertically swinging the video camera placed on the vertical moving portion. When the video camera is rotated upward or downward by a prescribed angle from a state horizontally placed on this video camera pan head, the arbor comes into contact with the terminals of the slits, thereby regulating the swinging range of the vertical moving portion.

The aforementioned Japanese Patent Laying-Open No. 2001-146874 discloses an OA apparatus tilting structure (display screen turning apparatus) comprising a fixing bracket fixed to a stand arranged vertically from a horizontal plane and provided with a rotation center hole and an arcuate slot concentric with the rotation center hole, a rotation-side bracket, fixed to the rear surface of a liquid crystal monitor, provided with a shaft and a subshaft on a position opposite to the fixing bracket, a plurality of spring washers and nuts. In this OA apparatus tilting structure (display screen turning apparatus) described in Japanese Patent Laying-Open No. 2001-146874, the shaft and the subshaft are inserted into the rotation center hole and the arcuate slot of the fixing bracket respectively and clamped by the nuts through the plurality of spring washers, so that the subshaft of the rotation-side bracket is movably supported in the slot. When the monitor is rotated upward by a prescribed angle from a state vertically arranged on the OA apparatus tilting structure, the subshaft of the rotation-side bracket reaches the terminal of the arcuate slot, thereby regulating the rotational range of the monitor.

The aforementioned National Patent Publication Gazette No. 2004-522918 discloses a flat liquid crystal display support (display screen turning apparatus) comprising a hollow shaft arm horizontally supported on a pole (support post) arranged vertically from a horizontal plane by a stirrup (clamp member), a cage (holding member) fixed to the forward end of the arm and provided with a semispherical inner surface, a ball fixed to the rear surface of a flat liquid crystal screen and provided with a semispherically formed surface, a tie rod (coupling rod) and an adjusting nut. In this flat liquid crystal display support (display screen turning apparatus) described in National Patent Publication Gazette No. 2004-522918, the semicircular surface of the ball is slidably fitted with the inner surface of the cage while the tie rod passing through the cage and the ball from the inner part of the arm is clamped by the adjusting nut, thereby rotatably supporting the ball in the cage. When the flat liquid crystal screen is rotated upward, downward, leftward or rearward from a state vertically arranged on the flat liquid crystal display support, an annular end of the cage comes into contact with an end of the semicircular surface of the ball, thereby regulating the turning range of the flat liquid crystal screen.

The aforementioned Japanese Patent Laying-Open No. 2006-64786 discloses a liquid crystal display comprising a support member fixed to a base and an arm fixed to a liquid crystal panel and arranged in a vertical direction. In this liquid crystal display described in Japanese Patent Laying-Open No. 2006-64786, the lower end of the arm so is rotatably mounted on the support member as to rotate the liquid panel upward or downward by a prescribed angle from a vertically arranged state.

In the conventional monitor positioner proposed in the aforementioned Japanese Utility Model Registration No. 3079007, however, the planar portions of the through-shaft of the pivot come into contact with the inner side surface of the figure-eight limiting hole thereby regulating rotation of the monitor when the monitor is rotated frontward or rearward by the prescribed angle, while rotation of the through-shaft is not regulated when the monitor is vertically arranged with respect to the main seat. Therefore, the monitor (display screen) disadvantageously unnecessarily jolts due to insufficient clamping force (tightening torque of the nut) for the through-shaft with respect to the fixed seat or the own weight of the monitor. Further, the monitor positioner described in the aforementioned Japanese Utility Model Registration No. 3079007 is so formed as to rotate the through-shaft of the pivot along with the monitor. When turning means utilizing the driving force of an electric motor and a plurality of gear trains is applied to this monitor positioner, therefore, it is conceivably necessary to ensure a larger radius of rotation of the pivot meshing with the final gear of the gear trains thereby reducing influence exerted by a clearance between the gear trains (unnecessary rotation between gears) on the rotation angle of the pivot as a countermeasure for reducing the quantity of jolting upon rotation of the monitor resulting from the clearance (backlash) between the plurality of gear trains. If the radius of rotation of the pivot is merely increased, however, the size (height, for example) of the monitor positioner (display screen turning apparatus) may be disadvantageously increased.

In the conventional video camera pan head proposed in the aforementioned Japanese Utility Model Registration No. 3092391, the arbor of the vertical moving portion comes into contact with the terminals of the slits of the side plates thereby regulating rotation of the video camera when the video camera is rotated frontward or rearward by the prescribed angle from a horizontal position, while rotation of the arbor of the vertical moving portion is not regulated when the video camera stands still on a substantially horizontal position. Therefore, the vide camera disadvantageously unnecessarily jolts with the vertical moving portion due to a clearance (backlash) between the gears or the own weight of the video camera.

In the conventional OA apparatus tilting structure proposed in the aforementioned Japanese Patent Laying-Open No. 2001-146874, the subshaft of the rotation-side bracket comes into contact with the inner side surface of the slot thereby regulating rotation of the liquid crystal monitor when the liquid crystal monitor is rotated frontward or rearward by a prescribed angle, while rotation of the subshaft is not regulated when the liquid crystal monitor is vertically arranged. Therefore, the liquid crystal monitor (display screen) disadvantageously unnecessarily jolts due to insufficient tightening torque for the subshaft with respect to the fixing bracket or the own weight of the liquid crystal monitor. Further, the OA apparatus tilting structure described in the aforementioned Japanese Patent Laying-Open No. 2001-146874 is so formed as to rotate the shaft of the rotation-side bracket along with the liquid crystal monitor. When turning means utilizing the driving force of an electric motor and a plurality of gear trains is applied to this OA apparatus tilting structure, therefore, it is conceivably necessary to ensure a larger radius of rotation of the shaft meshing with the final gear of the gear trains thereby reducing influence exerted by a clearance between the gear trains (unnecessary rotation between gears) on the rotation angle of the shaft as a countermeasure for reducing the quantity of jolting upon rotation of the liquid crystal monitor resulting from the clearance (backlash) between the plurality of gear trains. If the radius of rotation of the shaft is merely increased, however, the size (height, for example) of the OA apparatus tilting apparatus (display screen turning apparatus) may be disadvantageously increased.

In the conventional flat liquid crystal display support proposed in the aforementioned National Patent Publication Gazette No. 2004-522918, the annular end of the cage comes into contact with the end of the ball thereby regulating rotation of the flat liquid crystal screen when the flat liquid crystal screen is rotated upward, downward, leftward or rearward by a prescribed angle, while rotation of the ball is not restricted when the flat liquid crystal screen is vertically set. Therefore, the flat liquid crystal screen disadvantageously unnecessarily jolts due to insufficient tightening torque of the adjusting nut with respect to the tie rod or the own weight of the flat liquid crystal screen.

The aforementioned Japanese Patent Laying-Open No. 2006-64786 proposing the conventional liquid crystal display neither discloses nor suggests a mechanism for rotating the arm with respect to the support member when the liquid crystal panel is anteroposteriorly rotated by a prescribed angle. Therefore, the liquid crystal panel (display screen) may disadvantageously unnecessarily jolt due to insufficient supporting in a support mechanism for rotatably supporting the arm with respect to the support member or the own weight of the liquid crystal panel.

SUMMARY OF THE INVENTION

The present invention has been proposed in order to solve the aforementioned problems, and an object of the present invention is to provide a display screen turning apparatus capable of suppressing size increase of the apparatus and inhibiting a display screen from unnecessary jolting.

A display screen turning apparatus according to an aspect of the present invention comprises a plate-shaped support shaft, a display screen support member, including a sectorial first hole receiving the plate-shaped support shaft, provided on the side of a display screen and rotatable around a first end, serving as the rotation center, of the plate-shaped support shaft and a base support member, including a sectorial second hole receiving the plate-shaped support shaft, provided on the side of a base, while a first root portion of the sectorial first hole closer to the center of a circle is arranged on the upper side of the first hole, a second root portion of the sectorial second hole closer to the center of a circle is arranged on the lower side of the second hole, and a first side surface of the plate-shaped support shaft inserted into the sectorial first hole is inclined by a prescribed angle with respect to a vertical direction to come into contact with a first inner side edge of the sectorial second hole of the base support member when the display screen is vertically arranged with respect to a horizontal plane along with the display screen support member.

As hereinabove described, the display screen turning apparatus according to the aspect of the present invention comprises the display screen support member, including the sectorial first hole receiving the plate-shaped support shaft, rotatable around the first end, serving as the rotation center, of the plate-shaped support shaft and the base support member including the sectorial second hole receiving the plate-shaped support shaft while the first root portion of the sectorial first hole closer to the center of the circle is arranged on the upper side of the first hole, the second root portion of the sectorial second hole closer to the center of the circle is arranged on the lower side of the second hole, and the first side surface of the plate-shaped support shaft inserted into the sectorial first hole comes into contact with the first inner side edge of the sectorial second hole of the base support member when the display screen is vertically arranged with respect to the horizontal plane along with the display screen support member, whereby the support shaft comes into contact with the second hole of the base support member to be unmoving with respect to the second hole while the display screen support member is rotated around the first root portion, serving as the rotation center, located on the upper side of the first hole of the display screen support member with respect to the support shaft when the display screen is rotated from the vertically arranged state. Thus, the distance between a gear train (driving source) arranged under the display screen support member and the rotation center of the display screen support member can be increased as compared with a case where the display screen support member is rotated around the second root portion located on the lower side of the second hole of the base support member, whereby influence exerted by a clearance in the gear train (jolting resulting from the clearance) on the rotation angle of the display screen support member can be reduced. Therefore, the radius of rotation of the display screen support member can be increased without changing the sizes of the support shaft and the display screen support member in order to suppress influence exerted by the clearance in the gear train, whereby the display screen turning apparatus can be inhibited from size increase. When the display screen is vertically arranged with respect to the horizontal plane along with the display screen support member, the first side surface of the plate-shaped support shaft inserted into the sectorial first hole is inclined by the prescribed angle with respect to the vertical direction to come into contact with the first inner side edge of the sectorial second hole of the base support member so that the first side surface of the plate-shaped support shaft can come into contact with the first inner side edge of the sectorial second hole provided in the base support member due to a component of the own weight of the display screen, whereby the display screen is kept in the vertically arranged state by the support shaft and inhibited from easy rotation. Therefore, the display screen can be inhibited from unnecessary jolting.

In the display screen turning apparatus according to the aforementioned aspect, the first root portion of the sectorial first hole of the display screen support member is preferably rotated around the first end of the plate-shaped support shaft from the state where the display screen is vertically arranged with respect to the horizontal plane along with the display screen support member thereby rotating the display screen rearward by a first prescribed angle. According to this structure, the user can finely adjust the rotation angle of the display screen with respect to movement of the gear train (driving source) when adjusting the direction of the display screen in the range of the first prescribed angle from a state substantially parallelly facing the display screen, due to the long distance between the gear train (driving source) arranged under the display screen support member and the first root portion serving as the rotation center of the display screen support member.

In the display screen turning apparatus according to the aforementioned aspect, the plate-shaped support shaft is preferably inclined by the prescribed angle from the vertical direction in the state where the display screen is vertically arranged so that the first side surface of the plate-shaped support shaft is pressed to come into contact with the first inner side edge of the sectorial second hole of the base support member due to a component, perpendicular to the first side surface of the plate-shaped support shaft, included in a vertical load resulting from the own weight of the display screen. According to this structure, the support shaft can easily come into contact with the first inner side edge of the second hole of the base support member due to the component of the vertical load when the vertical load resulting from the own weight of the display screen is applied to the plate-shaped support shaft. Therefore, rotation of the support shaft can be reliably regulated when the display screen is vertically arranged.

In the display screen turning apparatus according to the aforementioned aspect, the plate-shaped support shaft preferably includes the first end formed in a direction perpendicular to the thickness direction and a second end formed on a side opposite to the first end, and the plate-shaped support shaft is preferably inclined by the prescribed angle from the vertical direction in the state where the display screen is vertically arranged so that the second end of the plate-shaped support shaft is pressed to come into contact with the second root portion of the sectorial second hole of the base support member due to a component, in a direction along the first side surface of the plate-shaped support shaft, included in a vertical load resulting from the own weight of the display screen. According to this structure, the support shaft can easily come into contact with the second root portion of the second hole of the base support member due to the component of the vertical load when the vertical load resulting from the own weight of the display screen is applied to the plate-shaped support shaft. Therefore, rotation of the support shaft can be more reliably regulated when the display screen is vertically arranged.

In the aforementioned structure having the second end of the plate-shaped support shaft coming into contact with the second root portion of the base support member, the plate-shaped support shaft preferably receives the own weight of the display screen on the second end. According to this structure, the plate-shaped support shaft can receive the own weight of the display screen on the stronger second end in the direction perpendicular to the thickness direction, whereby the plate-shaped support shaft can be inhibited from deformation resulting from the own weight of the display screen.

In the display screen turning apparatus according to the aforementioned aspect, a line segment connecting the first root portion of the sectorial first hole of the display screen support member closer to the center of the circle and the second root portion of the sectorial second hole of the base support member closer to the center of the circle is preferably inclined by the prescribed angle with respect to the vertical direction when the display screen is vertically arranged with respect to the horizontal plane along with the display screen support member. According to this structure, the support shaft can be kept in the state inclined by the prescribed angle due to the first root portion of the first hole of the display screen support member and the second root portion of the second hole of the base support member when the display screen is vertically arranged.

In the display screen turning apparatus according to the aforementioned aspect, the plate-shaped support shaft preferably includes the first end formed in a direction perpendicular to the thickness direction and a second end formed on a side opposite to the first end, and the plate-shaped support shaft is preferably kept in a state where the first end and the second end are held by the first root portion of the sectorial first hole of the display screen support member and the second root portion of the sectorial second hole of the base support member respectively. According to this structure, the plate-shaped support shaft is regularly held by the first root portion of the display screen support member and the second root portion of the base support member regardless of the rotation angle of the display screen, whereby the support shaft can be easily inhibited from axial displacement upon rotation.

In the display screen turning apparatus according to the aforementioned aspect, the display screen is preferably so formed that the first root portion of the sectorial first hole of the display screen support member is rotated frontward or rearward around the first end, serving as the rotation center, of the plate-shaped support shaft until the first side surface of the plate-shaped support shaft or a second side surface opposite to the first side surface in the thickness direction comes into contact with the inner side edge of the sectorial first hole of the display screen support member. According to this structure, the first or second side surface of the plate-shaped support shaft and the inner side edge of the first hole of the display screen support member so come into contact with each other as to reliably stop frontward or rearward rotation of the display screen.

In the aforementioned structure having the display screen rotated by the first prescribed angle, the display screen is preferably rotated rearward by the first prescribed angle along with the display screen support member from the state where the first root portion of the sectorial first hole of the display screen support member is rotated around the first end, serving as the rotation center, of the plate-shaped support shaft and thereafter so switched that the second end of the plate-shaped support shaft is rotated around the second root portion, serving as the rotation center, of the sectorial second hole of the base support member to be further rotated rearward by a second prescribed angle. According to this structure, the user can further rotate the display screen by the second prescribed angle when it is necessary to rotate the display screen rearward from the state vertically arranged with respect to the horizontal plane to a position exceeding the first prescribed angle, whereby the display screen turning apparatus can be improved in user-friendliness.

In the aforementioned structure having the display screen further rotated by the second prescribed angle, the plate-shaped support shaft is preferably rotated around the second end, serving as the rotation center, of the plate-shaped support shaft inside the sectorial second hole of the base support member when the display screen is rotated by the second prescribed angle along with the display screen support member, so that the display screen is rotated along with the display screen support member. According to this structure, the plate-shaped support shaft is integrally rotated with the display screen support member when the display screen is rotated by the second prescribed angle, whereby the plate-shaped support shaft can easily serve as a rotating shaft.

In the aforementioned structure having the display screen further rotated by the second prescribed angle, the display screen is preferably rotated rearward by the first prescribed angle and the second prescribed angle to a state arranged substantially parallelly to the horizontal plane from the state vertically arranged with respect to the horizontal plane along with the display screen support member. According to this structure, the display screen can be tilted rearward up to about 90° from the state vertically arranged with respect to the horizontal plane, whereby the user can compactly store a display when moving the display or not using the same.

In the aforementioned structure having the display screen further rotated by the second prescribed angle, the display screen support member is preferably rotated in a state where an arcuate portion of the sectorial first hole of the display screen support member is not in contact with the second end of the plate-shaped support shaft when the display screen is rotated by the first prescribed angle, and the plate-shaped support shaft is preferably rotated with the display screen support member in a state where an arcuate portion of the sectorial second hole of the base support member is not in contact with the first end of the plate-shaped support shaft when the display screen is rotated by the second prescribed angle. According to this structure, the first end of the plate-shaped support shaft and the first root portion of the first hole of the display screen support member come into contact with each other when the display screen support member is rotated by the first prescribed angle while the plate-shaped support shaft is rotated by the second prescribed angle in the state where the second end thereof and the second root portion of the second hole of the base support member are in contact with each other, whereby the display screen can be smoothly rotated.

In this case, the radial lengths of the sectorial first hole and the sectorial second hole are preferably larger than the radial width of the plate-shaped support shaft respectively. According to this structure, the lower and upper ends of the support shaft can be inhibited from coming into contact with the arcuate portions of the first and second holes respectively upon rotation of the display screen support member. Therefore, the components of the display screen turning apparatus do not jolt upon rotation of the display screen, whereby the display screen can be stably rotated.

In the display screen turning apparatus according to the aforementioned aspect, the thickness of the plate-shaped support shaft and the widths of the first root portion of the sectorial first hole and the second root portion of the sectorial second hole in the thickness direction of the support shaft are preferably substantially equal to each other. According to this structure, the support shaft inserted into the display screen support member and the base support member can be inhibited from deviating from the root portion of the first hole of the display screen support member rotated around the upper end of the support shaft and the root portion of the second hole of the base support member rotated around the lower end of the support shaft upon rotation of the display screen support member. Therefore, the display screen can be smoothly rotated.

In the display screen turning apparatus according to the aforementioned aspect, the display screen support member is preferably provided with a pair of sectorial first holes and the base support member is preferably provided with a pair of sectorial second holes respectively, a pair of plate-shaped support shafts are preferably provided correspondingly to combinations of the pair of sectorial first holes and the pair of sectorial second holes respectively, and the pair of plate-shaped support shafts preferably pass through the sectorial first holes and the sectorial second holes in the combinations respectively. According to this structure, the display screen can be rotated frontward or rearward in a state supported through the pair of rotating shafts, whereby the display screen can be stably rotated frontward or rearward also when the same has a large size and a heavy weight.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structures of a display screen turning apparatus 20 according to the embodiment of the present invention and a liquid crystal television 100 provided with the display screen turning apparatus 20 are described with reference to FIGS. 1 to 14. According to this embodiment, the present invention is applied to the display screen turning apparatus 20 constituting the liquid crystal television 100 employed as an exemplary display.

Figure 1:
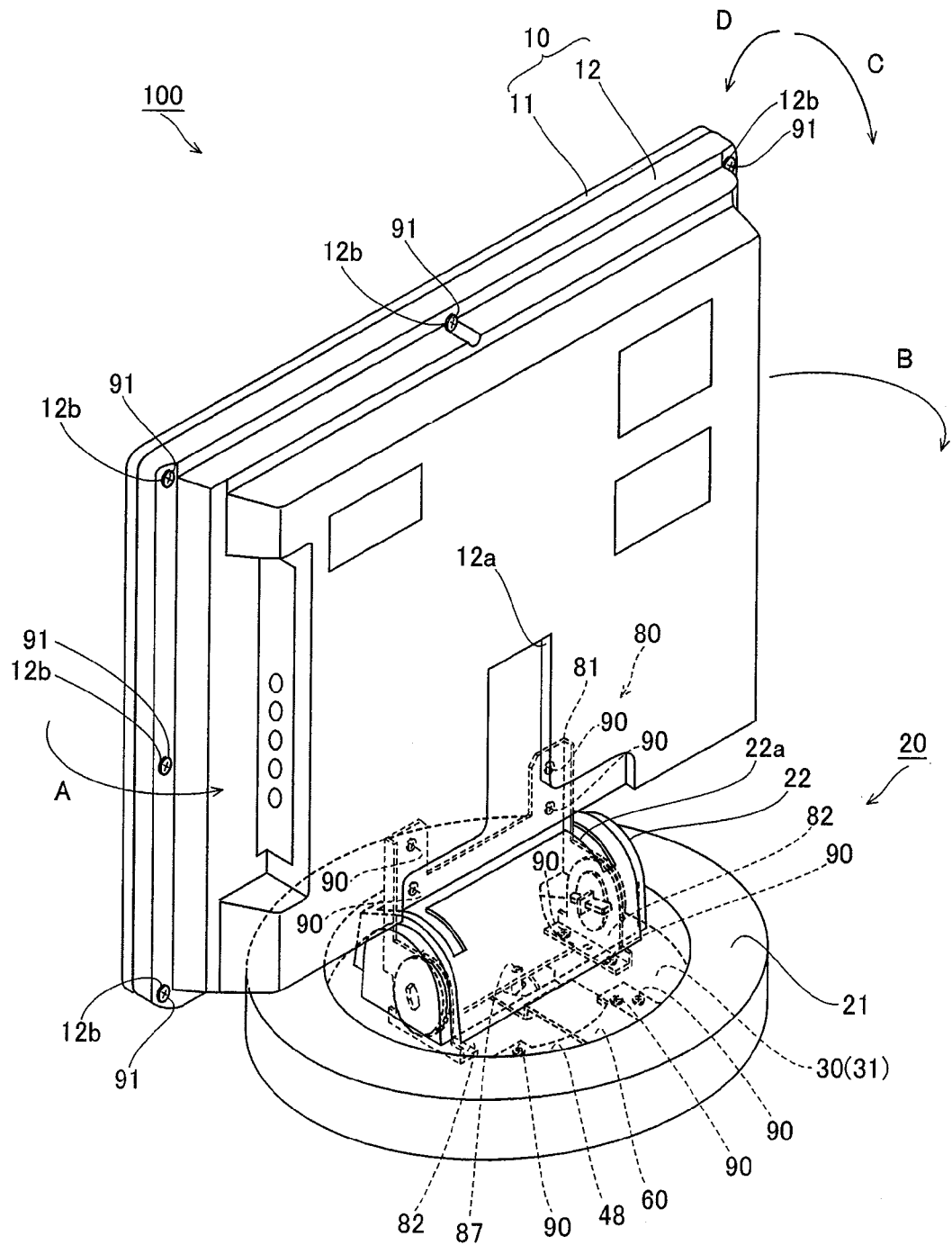
FIG. 1 is a perspective view showing the overall structure of a liquid crystal television provided with a display screen turning apparatus according to an embodiment of the present invention.

The display screen turning apparatus 20 according to the embodiment of the present invention is so provided as to turn a display body 10 of the liquid crystal television 100 supported by a display screen support mechanism 80 in a horizontal direction (along arrow A or B) in a horizontal plane within a prescribed angular range (±30° in this embodiment) and to incline the display body 10 in an anteroposterior direction (along arrow C or D) with respect to a vertical plane within another prescribed angular range (−10° (frontward) to +90° (rearward) in this embodiment), as shown in FIG. 1. The display body 10 is an example of the "display screen" in the present invention.

Figure 2:
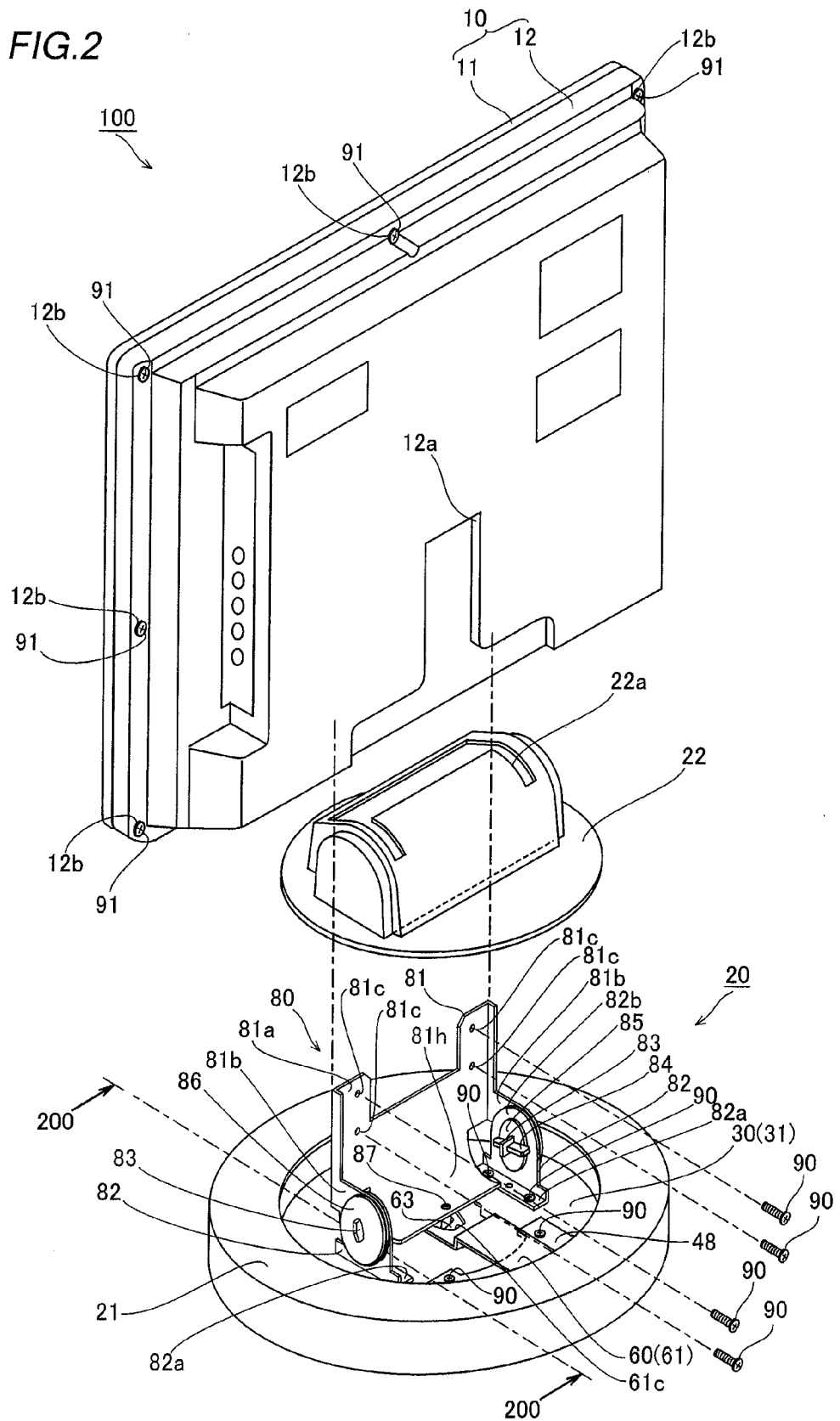
FIG. 2 is an exploded perspective view of the liquid crystal television provided with the display screen turning apparatus according to the embodiment shown in FIG. 1.
Figure 3:
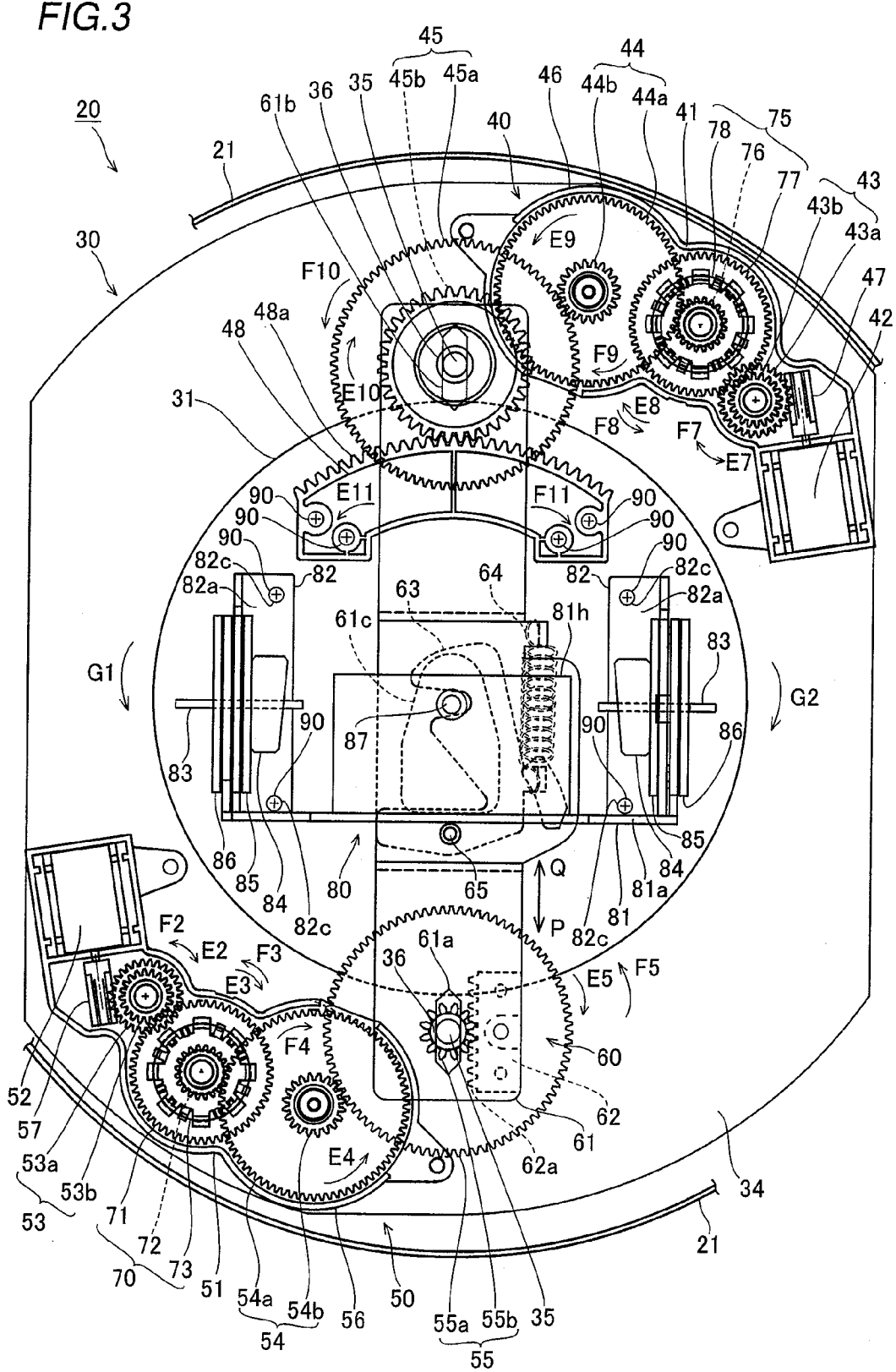
FIG. 3 is a plan view of the display screen turning apparatus according to the embodiment shown in FIG. 1.

As shown in FIG. 3, the display screen turning apparatus 20 is constituted of a base 30 for turning the display body 10 (see FIG. 2) supported by the display screen support mechanism 80 (see FIG. 2) in the horizontal direction (along arrow A or B in FIG. 1) in the horizontal plane, a horizontal turning/driving portion 40 turning a turntable 31, described later, arranged on the base 30 in the horizontal direction (along arrow A or B in FIG. 1) while controlling the turning angle of the turntable 31 and a vertical turning/driving portion 50 turning the display body 10 (see FIG. 2) supported by the display screen support mechanism 80 (see FIG. 2) in the anteroposterior direction (along arrow C or D in FIG. 1) with respect to the vertical plane by a prescribed angle while controlling the turning angle of the display screen support mechanism 80.

Figure 4:
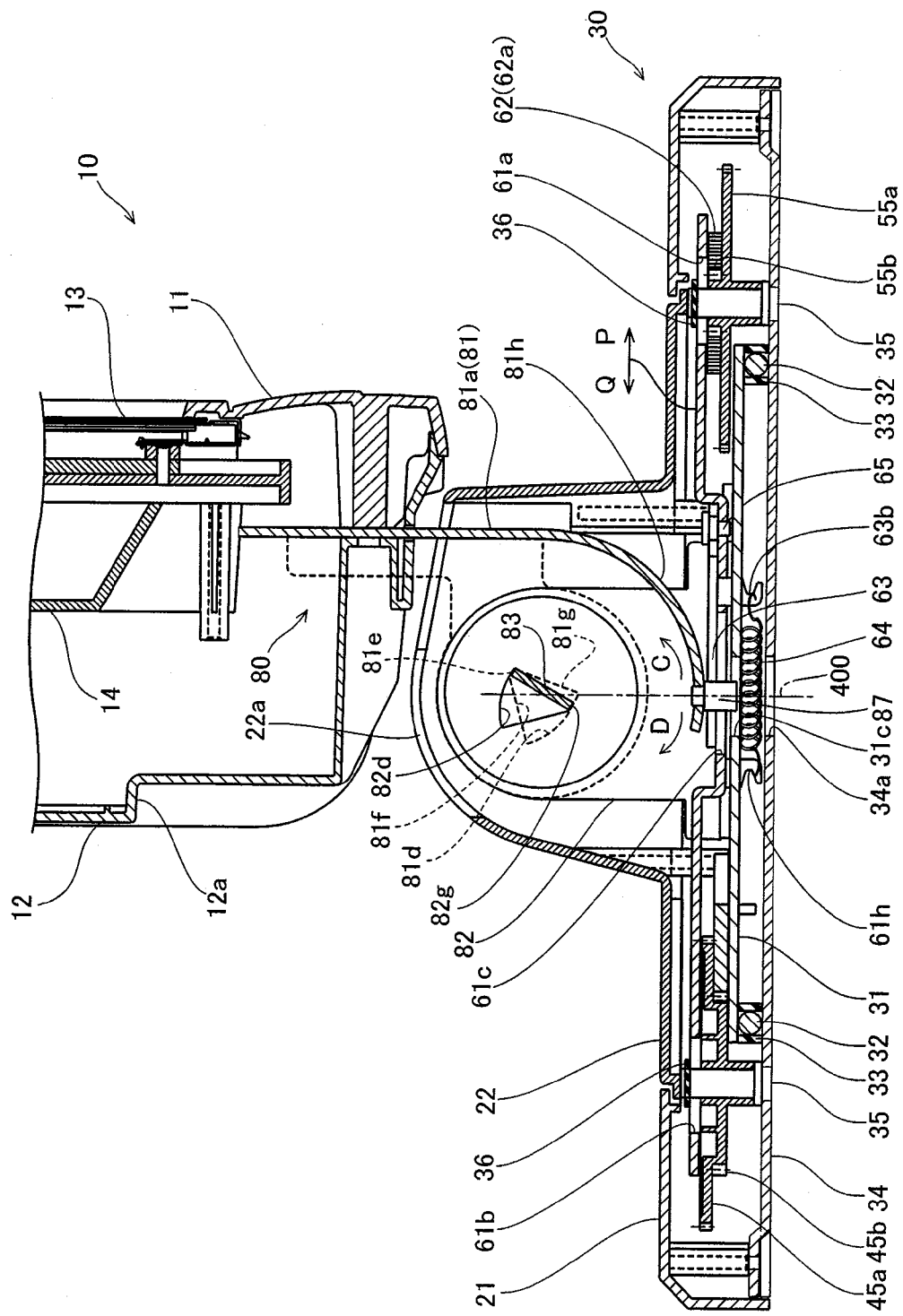
FIG. 4 is a sectional view for illustrating the structure of the display screen turning apparatus according to the embodiment shown in FIG. 1.
Figure 5:
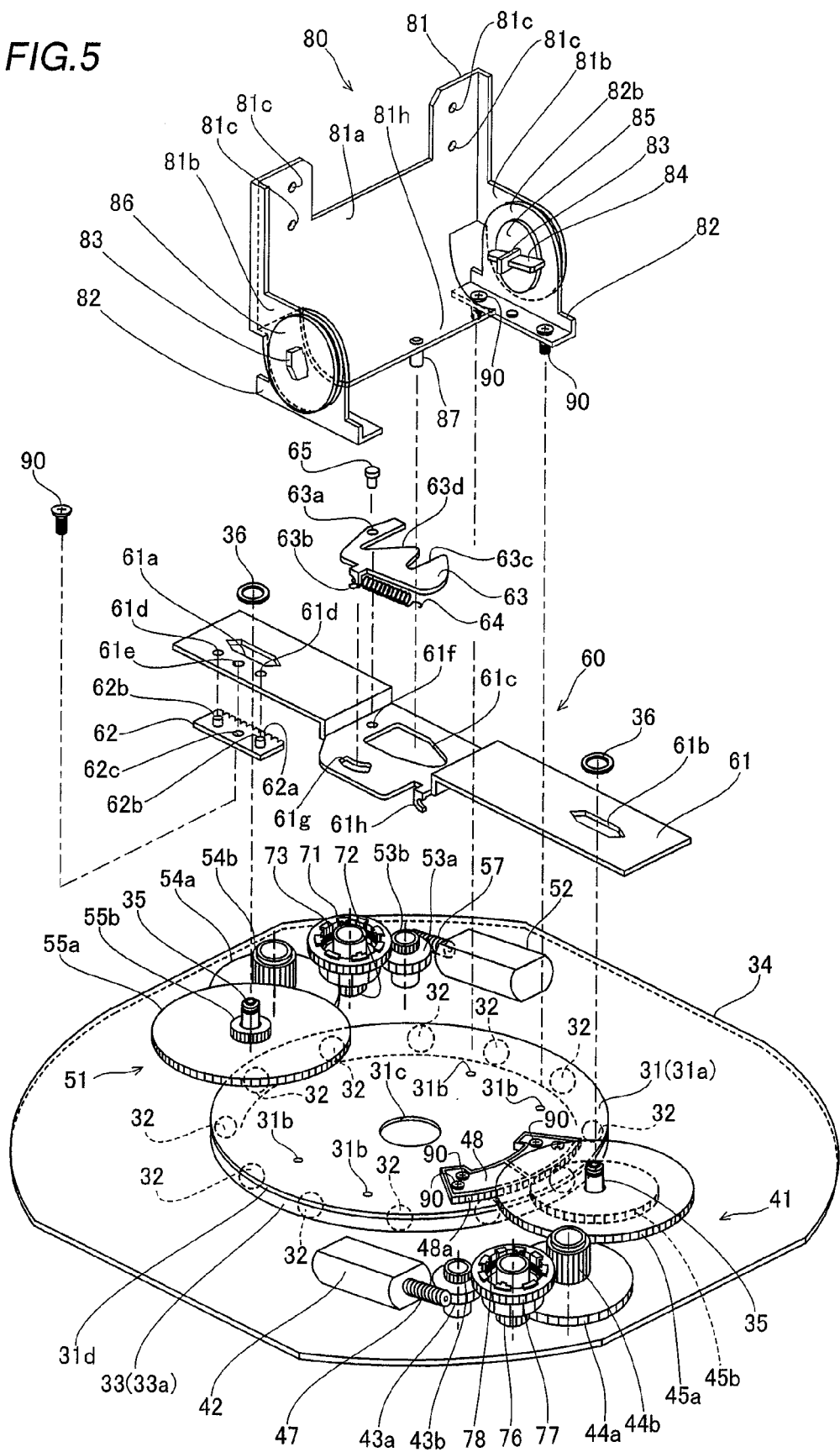
FIG. 5 is an exploded perspective view for detailedly illustrating the structure of the display screen turning apparatus according to the embodiment shown in FIG. 1.

As shown in FIGS. 3 to 5, the base 30 is constituted of the turntable 31 of sheet metal mounted with the display screen support mechanism 80 (see FIG. 2) on the upper surface thereof, a guide member 33 (see FIG. 5) of resin having a plurality of (12 in this embodiment) steel balls 32 (see FIG. 5) arranged at a prescribed interval (interval of about 30° in this embodiment) therein while rotatably holding the steel balls 32 (see FIG. 5), a base member 34 of sheet metal, a support member (not shown) of metal rotatably supporting the turntable 31 on the base member 34, boss members 35 of resin rotatably inserted into rotating shafts of gears 45 and 55 described later and inserted into a rack plate 60 of the vertical turning/driving portion 50 described later so that the rack plate 60 is reciprocative in the horizontal plane and stop ring members 36 for the rack plate 60 receiving the boss members 35.

As shown in FIGS. 3 and 5, the vertical turning/driving portion 50 is constituted of a transmission gear portion 51 formed by a plurality of gear members, a stepping motor 52 serving as the driving source for the transmission gear portion 51 and the rack plate 60 for rotating a display screen support member 81 rotatably provided on the display screen support mechanism 80 mounted on the turntable 31 of the base 30 in the anteroposterior direction (along arrow C or D in FIG. 1) with respect to the vertical plane. This vertical turning/driving portion 50 is arranged in the base 30, as shown in FIGS. 3 to 5.

Figure 8:
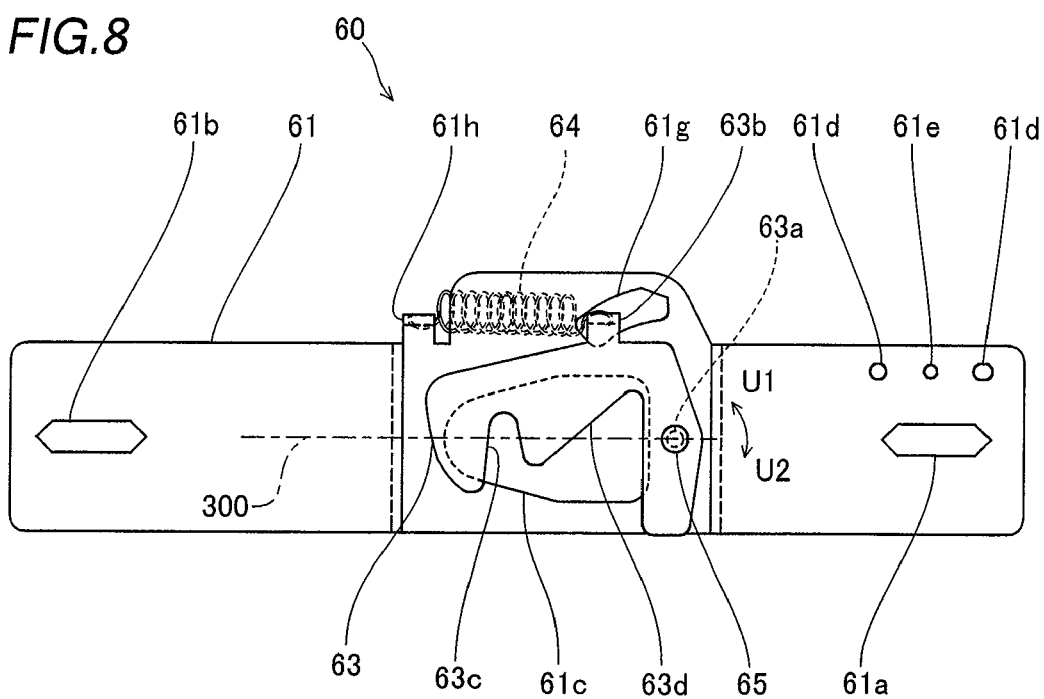
FIG. 8 is a diagram for illustrating the structure of a rack plate in the vertical turning/driving portion of the display screen turning apparatus according to the embodiment shown in FIG. 1.

As shown in FIG. 5, the rack plate 60 of the vertical turning/driving portion 50 is constituted of a plate member 61 of sheet metal, a rack gear 62 of resin, a lock lever 63 of sheet metal, a spring member 64 (coil spring in this embodiment) and a pin member 65. The rack gear 62 is mounted on the lower surface of the plate member 61 with a screw 90, as shown in FIG. 5. The rack gear 62 horizontally meshes with a small-diametral gear portion 55b of the gear 55 described later, as shown in FIG. 3. The plate member 61 has slots 61a and 61b provided in the vicinity of both longitudinal ends of the plate member 61 to extend along the longitudinal direction thereof and a hole 61c provided substantially at the center of the plate member 61, as shown in FIGS. 5 and 8. When the pair of boss members 35 provided on the base member 34 are inserted into the rack plate 60 through the slots 61a and 61b of the plate member 61 respectively, the rack plate 60 can reciprocate (slide) along arrow P or Q, as shown in FIGS. 3 and 4. Therefore, normal or reverse rotation of the stepping motor 52 is so transmitted to the rack gear 62 through the transmission gear portion 51 that the rack plate 60 can reciprocate on the turntable 31 along arrow P or Q. The hole 61c of the plate member 61 is so formed that an engaging member 87, described later, of the display screen support mechanism 80 is freely movable in this hole 61c, as shown in FIGS. 3 and 5.

The plate member 61 includes two positioning holes 61d and a screw mounting hole 61e, as shown in FIGS. 5 and 8. The rack gear 62 has a gear portion 62a formed along a first longitudinal side surface, two bosses 62b and a screw receiving hole 62c, as shown in FIGS. 5 and 8. Therefore, the bosses 62b of the rack gear 62 are fitted into the positioning holes 61d of the plate member 61 while the screw 90 is clamped into the screw mounting hole 61e of the plate member 61 through the screw receiving hole 62c of the rack gear 62 so that the rack gear 62 can be mounted on the plate member 61 from below, as shown in FIG. 5.

As shown in FIGS. 5 and 8, the pin member 65 of the rack plate 60 is successively inserted into holes 63a and 61f of the lock lever 63 and the plate member 61 from above the plate member 61, for horizontally rotatably mounting the lock lever 63 on the plate member 61. As shown in FIG. 8, the spring member 64 engages with hook portions 63b and 61h of the lock lever 63 and the plate member 61. Therefore, the lock lever 63 is generally arranged on the position shown in FIG. 8, due to the tensile force of the spring member 64. At this time, the hook portion 63b of the lock lever 63 is movable (rotatable) in a hole 61g of the plate member 61, as shown in FIG. 8.

The lock lever 63 integrally has an engaging portion 63c engageable with the engaging member 87 (see FIG. 5) of the display screen support mechanism 80 (see FIG. 5), as shown in FIGS. 5 and 8. As the rack plate 60 reciprocates (slides) along arrow P or Q, therefore, the lock lever 63 also reciprocates integrally with the rack plate 60 as shown in FIG. 3, whereby the display screen support member 81 (see FIG. 4) of the display screen support mechanism 80 (see FIG. 4) can be rotated in the vertical direction (along arrow C or D) along with the engaging member 87 (see FIG. 4).

The lock lever 63 has a guide portion 63d formed obliquely across a line segment 300 (shown by a one-dot chain line) connecting the hole 63a and the engaging portion 63c with each other, as shown in FIG. 8. This guide portion 63d is so provide as to easily guide the engaging member 87 (see FIG. 5) to the engaging portion 63c when recovering the engaging state between the engaging member 87 (see FIG. 5) and the engaging portion 63c.

Figure 6:
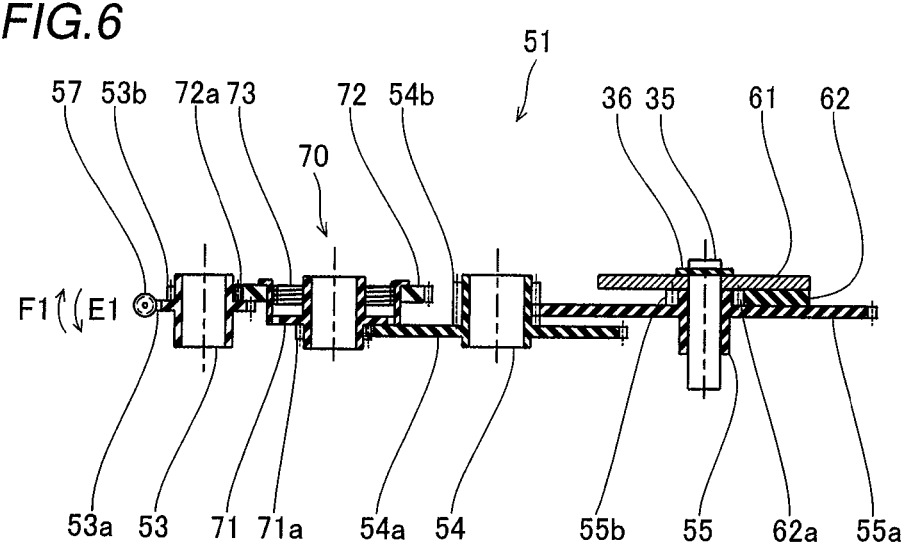
FIG. 6 is a diagram for illustrating the arrangement of a transmission gear portion in a vertical turning/driving portion of the display screen turning apparatus according to the embodiment shown in FIG. 1.

As shown in FIG. 3, the transmission gear member 51 is so formed that a gear 53 of resin, a torque limiter 70, another gear 54 of resin and still another gear 55 of resin are arranged in a gear box 56 of resin. The torque limiter 70 is constituted of a driven gear 71 of resin, a driving gear 72 of resin and a spring member 73 (coil spring in this embodiment) of metal, as shown in FIGS. 3 and 6. The gear 53 of resin integrally includes a large-diametral gear portion 53a and a small-diametral gear portion 53b, as shown in FIGS. 3 and 6. The gear 54 of resin also integrally includes a large-diametral gear portion 54a and a small-diametral gear portion 54b. Further, the gear 55 of resin also integrally includes a large-diametral gear portion 55a and the small-diametral gear portion 55b.

A worm gear 57 of resin is press-fitted into the rotating shaft of the stepping motor 52, as shown in FIGS. 3 and 5. The worm gear 57 meshes with the large-diametral gear portion 53a of the gear 53 so that the rotating shafts thereof are perpendicular to each other, as shown in FIGS. 3 and 6.

The small-diametral portion 53b of the gear 53 meshes with the gear portion 72a of the driving gear 72 of the torque limiter 70 so that the rotating shafts thereof are parallel to each other, as shown in FIGS. 5 and 6. Further, the gear portion 71a of the driven gear 71 of the torque limiter 70 meshes with the large-diametral gear portion 54a of the gear 54 so that the rotating shafts thereof are parallel to each other, while the small-diametral gear portion 54b of the gear 54 meshes with the large-diametral gear portion 55a of the gear 55 so that the rotating shafts thereof are parallel to each other, as shown in FIGS. 5 and 6. The small-diametral gear portion 55b of the gear 55 horizontally meshes with the gear portion 62a of the rack gear 62, as shown in FIGS. 5 and 6. Therefore, the driving force of the stepping motor 52 is transmitted to the rack plate 60 through the worm gear 57, the gear 53, the torque limiter 70, the gear 54, the gear 55 and the rack gear 62. FIGS. 5 and 6 omit the gear box 56 (see FIG. 3) for storing the transmission gear portion 51 and the stepping motor 52 therein, in order to illustrate the arrangement of the transmission gear portion 51.

Figure 9:
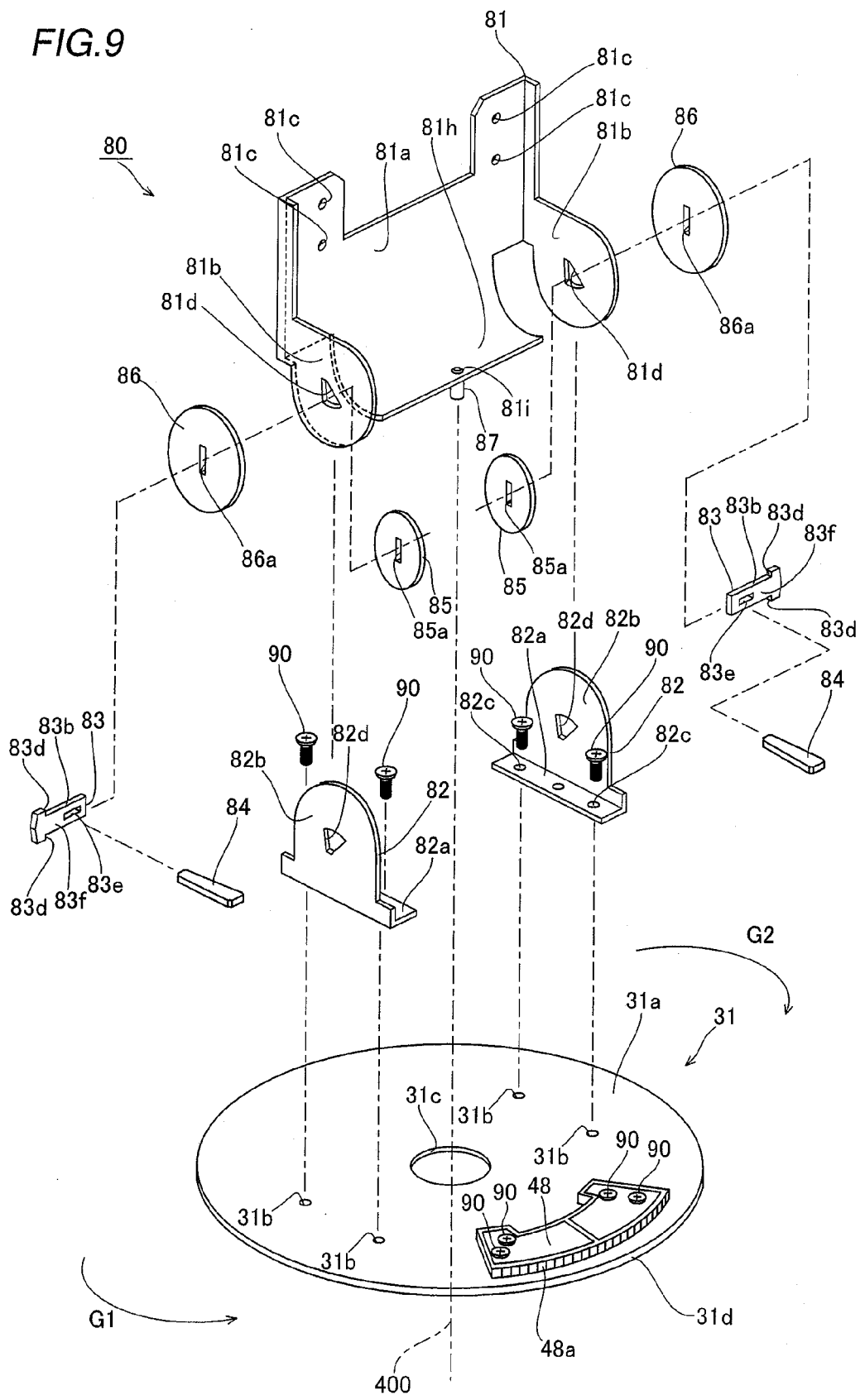
FIG. 9 is an exploded perspective view showing the structures of a display screen support mechanism and a turntable of the display screen turning apparatus according to the embodiment shown in FIG. 1.

The turntable 31 of the base 30 includes four screw mounting holes 31b provided on the upper surface 31a and a hole 31c provided at the center (in the vicinity of the rotation center of the turntable 31) of the upper surface 31a, as shown in FIGS. 5 and 9. As shown in FIG. 3, the turntable 31 is arranged substantially at the center of the base member 34, while a plurality of support members (not shown) so provided on the base member 34 as to circularly enclose the turntable 31 come into surface contact with the outer peripheral surfaces 31d and 33a (see FIG. 5) of the turntable 31 and the guide member 33 thereby rotatably holding the turntable 31.

The display screen support mechanism 80 is fixed to the screw mounting holes 31b of the base 30 with four screws 90 as shown in FIG. 2, for rendering the display body 10 rotatable in the anteroposterior direction (along arrow C or D) with respect to the vertical plane of the display screen turning apparatus 20 and supporting the display body 10 in a state inclined by a prescribed angle in the anteroposterior direction (along arrow C or D) with respect to the vertical plane of the display screen turning apparatus 20, as shown in FIG. 1.

According to this embodiment, the display screen support mechanism 80 is constituted of the display screen support member 81 of sheet metal, a pair of base support members 82, (two) plate-shaped support shafts 83 of sheet metal, (two) stop members 84 of sheet metal, (two) pressure plates 85 and (two) pressure plates 86 of sheet metal and the engaging member 87 of metal engaging with the engaging portion 63c of the lock lever 63 of the rack plate 60, as shown in FIGS. 5 and 9.

As shown in FIG. 9, the display screen support member 81 integrally includes a display body mounting portion 81a and a pair of rotating portions 81b. The display body mounting portion 81a of the display screen support member 81 is provided with four screw receiving holes 81c. The pair of rotating portions 81b of the display screen support member 81 extend from both side ends of the display body mounting portion 81a perpendicularly to the surface of the display body mounting portion 81a respectively. The pair of base support members 82 include turntable mounting portions 82a and rotating portion mounting portions 82b respectively, as shown in FIG. 9. Four screw mounting holes 82c (see FIG. 3) are provided on the turntable mounting portions 82a of the base support members 82. The rotating portion mounting portions 82b of the base support members 82 extend from first ends of the turntable mounting portions 82a vertically upward with respect to the surfaces of the turntable mounting portions 82a.

Figure 10:
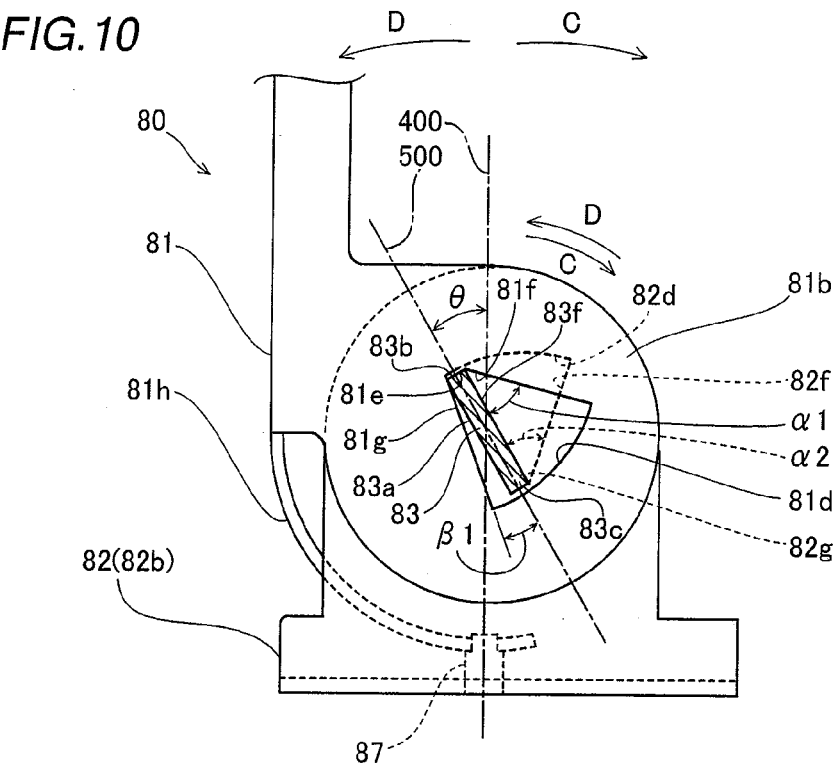
FIG. 10 is a sectional view taken along the line 200-200 in FIG. 2.
Figure 11:
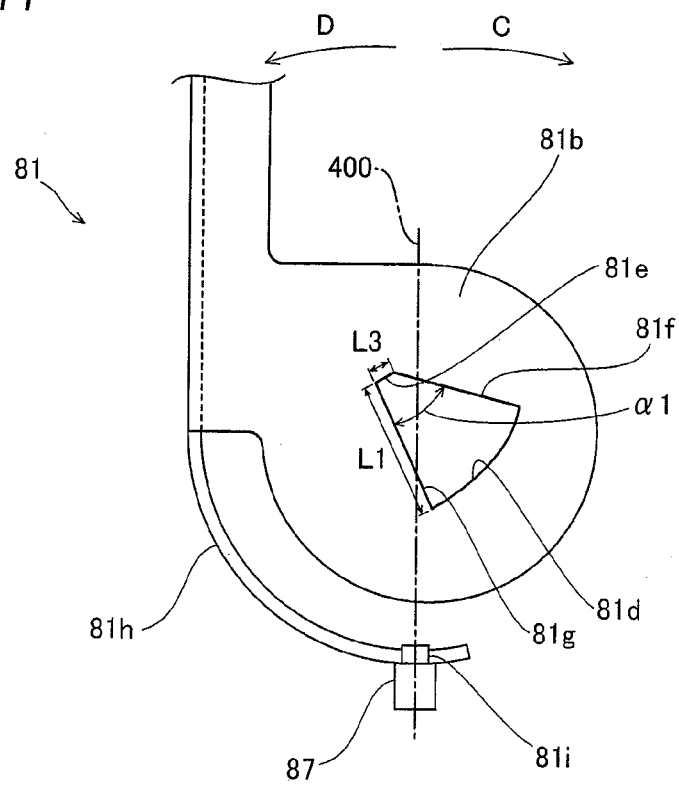
FIG. 11 is a front elevational view of a display screen support member in the display screen support mechanism of the display screen turning apparatus according to the embodiment shown in FIG. 1.
Figure 12:
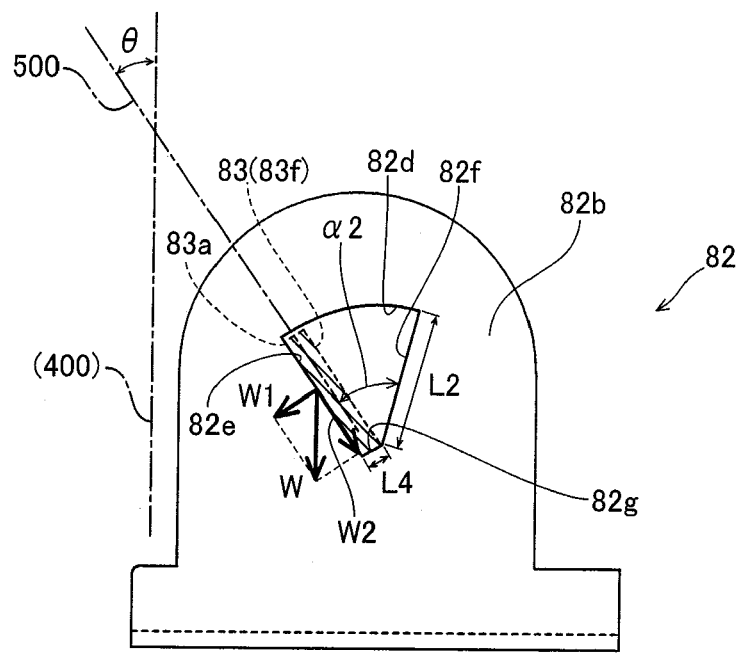
FIG. 12 is a front elevational view of a base support member in the display screen support mechanism of the display screen turning apparatus according to the embodiment shown in FIG. 1.

According to this embodiment, a sectorial hole 81d is provided in the vicinity of the rotation center of each of the pair of rotating portions 81b of the display screen support member 81, as shown in FIG. 11. Further, a sectorial hole 82d is provided on the rotating portion mounting portion 82b of each of the pair of base support members 82, as shown in FIG. 12. The holes 81d and 82d are examples of the "first hole" and the "second hole" in the present invention respectively. As shown in FIG. 10, the plate-shaped support shafts 83 are insertable into the holes 81d and 82d of the display screen support member 81 and the base support members 82 respectively. When the display body 10 (see FIG. 4) is vertically arranged with respect to the horizontal plane of the display screen turning apparatus 20 along with the display screen support member 81, side surfaces 83a of the support shafts 83 are inclined by a prescribed angle θ (about 30°) from the vertical direction (shown by a line segment 400 (one-dot chain line)) to come into contact with first edges 82e of the holes 82d of the base support members 82, as shown in FIG. 10. The side surfaces 83a are examples of the "first side surface" in the present invention, and the first edges 82e are examples of the "first inner side edge of the second hole" in the present invention.

According to this embodiment, the side surface 83a of each support shaft 83 is so pressed as to come into contact with the first edge 82e of the hole 82d of the corresponding base support member 82 due to a component W1 (=W sin θ), perpendicular to the side surface 83a of the support shaft 83 inclined by the prescribed angle θ (about 30°), included in a vertical load W resulting from the own weight of the display body 10 (see FIG. 4) transmitted through the corresponding hole 81d (see FIG. 11) of the display screen support member 81 (see FIG. 11), as shown in FIG. 12.

According to this embodiment, the lower end surface 83c of each support shaft 83 is so pressed as to come into contact with a root portion 82g of the hole 82d of the corresponding base support member 82 due to another component W2 (=W cos θ), in the direction along the side surface 83a of the support shaft 83 inclined by the prescribed angle θ (about 30°), included in the vertical load W resulting from the own weight of the display body 10 (see FIG. 4) transmitted through the corresponding hole 81d (see FIG. 11) of the display screen support member 81 (see FIG. 11), as shown in FIG. 12.

According to this embodiment, a root portion 81e of each hole 81d of the display screen support member 81 closer to the center of a circle is located on the upper side to come into contact with the upper end surface 83b of the corresponding support shaft 83, as shown in FIG. 11. Thus, the display screen support member 81 is rotated around the root portion 81e serving as the rotation center along arrow C or D. The upper end surface 83b and the root portion 81e are examples of the "first end" and the "first root portion" in the present invention respectively.

According to this embodiment, the root portion 82g of the hole 82d of each base support member 82 closer to the center of a circle is located on the lower side to come into contact with the lower end surface 83c of the corresponding support shaft 83, as shown in FIG. 12. When the display body 10 (see FIG. 4) is vertically arranged with respect to the horizontal plane receiving the display screen turning apparatus 20 along with the display screen support member 81, therefore, a line segment 500 (shown by another one-dot chain line) connecting the root portion 81e of each hole 81d of the display screen support member 81 and the root portion 82g of the hole 82d of the corresponding base support member 82 with each other is inclined by the prescribed angle θ (about 30°) from the vertical direction (shown by the line segment 400 (one-dot chain line)), as shown in FIG. 10. The lower end surface 83c and the root portion 82g are examples of the "second end" and the "second root portion" in the present invention respectively.

According to this embodiment, the radial length L1 (the length of first and second edges 81f and 81g) of each hole 81d of the display screen support member 81 is larger than the width L5 (see FIG. 13) of each support shaft 83, as shown in FIG. 11. The first and second edges 81f and 81g are examples of the "inner side edge of the first hole" in the present invention respectively. Further, the radial length L2 (the length of first and second edges 82e and 82f) of the hole 82d of each base support member 82 is slightly larger than the width L5 (see FIG. 13) of each support shaft 83, as shown in FIG. 12. Thus, the upper and lower surfaces 83b and 83c of each plate-shaped support shaft 83 do not come into contact with arcuate portions of the corresponding holes 81d and 82d respectively upon rotation of the display screen support member 81 and the support shaft 83. The second edge 82f is an example of the "inner side edge of the second hole" in the present invention.

According to this embodiment, the width L3 of the root portion 81e of each hole 81d of the display screen support member 81 is substantially identical to the thickness t1 (see FIG. 13) of each support shaft 83, as shown in FIG. 11. Further, the width L4 (see FIG. 9) of the root portion 82g of the hole 82d of each base support member 82 is substantially identical to the thickness t1 (see FIG. 13) of each support shaft 83, as shown in FIG. 12. Therefore, the upper and lower end surfaces 83b and 83c of each support shaft 83 are not displaced from the root portions 81e and 82g of the holes 81d and 82d of the display screen support member 81 and the corresponding base support member 82 respectively. According to this embodiment, each plate-shaped support shaft 83 has a rectangular section, while the upper and lower end surfaces 83b and 83c thereof are substantially constituted of flat surfaces having the thickness t1 (see FIG. 13), as shown in FIG. 10.

According to this embodiment, therefore, the display screen support mechanism 80 is so formed that the display screen support member 81 is rotatable around the upper end surfaces 83b, serving as the rotation centers, of the support shafts 83 along arrow C or D when the side surfaces 83a of the support shafts 83 are in contact with the first edges 82e of the holes 82d, and both of the display screen support member 81 and the support shafts 83 are rotatable around the lower end surfaces 83c, serving as the rotation centers, of the support shafts 83 along arrow C or D after the first edges 81f of the holes 81d of the display screen support member 81 reach and come into contact with the side surfaces 83f of the support shafts 83. The side surfaces 83f are examples of the "second side surface" in the present invention.

Each hole 81d of the display screen support member 81 has central angles α1 (about 45°) and β1 (about 10°) opening toward first and second sides from the line segment 400 (one-dot chain line) respectively, as shown in FIG. 10. Therefore, the display screen support member 81 is rotatable around the root portion 81e (shown by a broken line) of each sectorial hole 81d supported on the corresponding plate-shaped support shaft 83 in a sectorial angular range (α1+β1=about 55° in this embodiment) with respect to the support shaft 83. Further, the hole 82d (shown by another broken line) of each base support member 82 has a central angle α2 (about 45°) opening toward the first side from the segment 400 (one-dot chain line), as shown in FIGS. 10 and 12. Therefore, each support shaft 83 is rotatable around the root portion 82g of the sectorial hole 82d in another sectorial angular range (α2=about 45° in this embodiment) with respect to the corresponding base support member 82. The angles α1 and α2 are examples of the "first prescribed angle" and the "second prescribed angle" in the present invention respectively.

As shown in FIGS. 9 and 11, the display screen support member 81 is provided with an arm portion 81h downwardly extending from the display body mounting portion 81a to cover the outer peripheries of the rotating portions 81b. A mounting hole 81i for mounting the engaging member 87 is located on the lowermost part of the arm portion 81h substantially at the center of the arm portion 81h, as shown in FIGS. 9 and 11. The engaging member 87 is mounted on the mounting hole 81i by caulking, to be arranged on the vertical line segment 400 (one-dot chain line) passing through the rotation center (indicating the rotation center of the turntable 31) in the horizontal direction (along arrow G1 or G2) in the horizontal plane of the display screen support member 81, as shown in FIG. 9.

Figure 13:
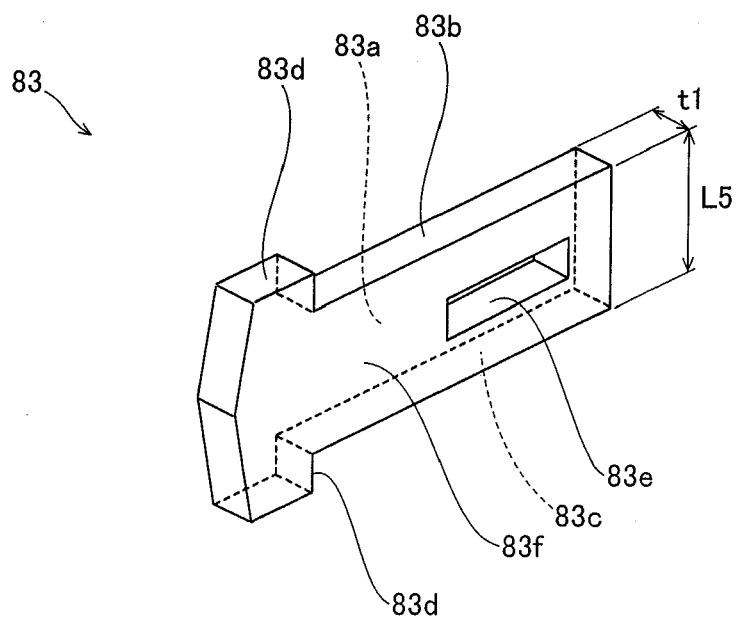
FIG. 13 illustrates a support shaft in the display screen support mechanism of the display screen turning apparatus according to the embodiment shown in FIG. 1.

Each plate-shaped support shaft 83 of sheet metal includes a pair of contact portions 83d and a rectangular hole 83e, as shown in FIG. 13. The pair of contact portions 83d of the support shaft 83 protrude from the rear ends of both side surfaces of the support shaft 83 extending in the longitudinal direction. These contact portions 83d are so provided as to come into contact with the corresponding pressure plate 86 of the display screen support member 81, as shown in FIGS. 2 and 9. The rectangular hole 83e of the support shaft 83 is so provided as to receive the corresponding stop member 84, as shown in FIGS. 2 and 9.

The pressure plates 85 and 86 are provided with rectangular holes 85a and 86a for receiving the support shafts 83 respectively. The display screen support member 81 is mounted on the pair of base support members 82 to be rotatable with torque exceeding a prescribed level, as shown in FIG. 2.

Figure 14:
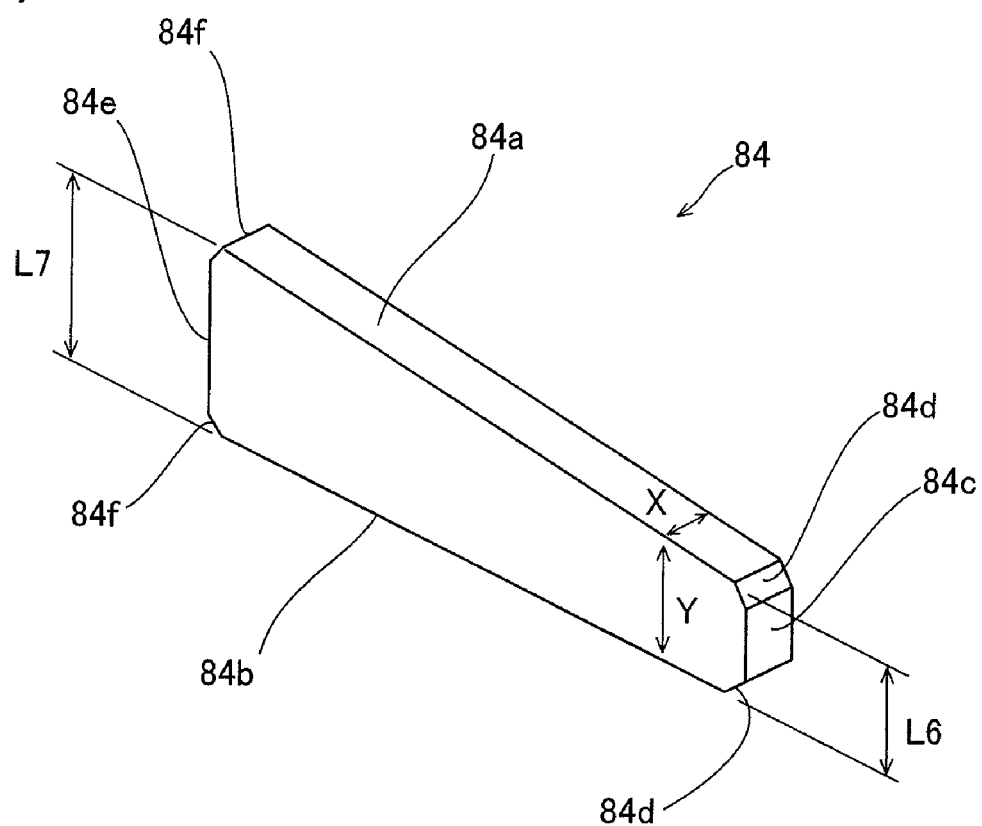
FIG. 14 illustrates a stop member in the display screen support mechanism of the display screen turning apparatus according to the embodiment shown in FIG. 1.

As shown in FIG. 14, each stop member 84 of sheet metal includes a tapered end surface 84a and another end surface 84b as well as chamfers 84d and 84f provided on first and second side surfaces 84c and 84e extending in the longitudinal direction respectively. The length L6 of the first side surface 84c of the stop member 84 is smaller than the length L7 of the second side surface 84e, so that the distance between the end surfaces 84a and 84b (length in a direction Y perpendicular to the thickness direction X of the stop member 84) linearly changes from L6 to L7, as shown in FIG. 14. Thus, each stop member 84 is so tapered (wedged) that the same is inhibited from easily slipping off the rectangular hole 83e (see FIG. 9) of the corresponding plate-shaped support shaft 83 when inserted into the same, as shown in FIG. 2. The chamfer 84b is so provided as to facilitate insertion of the stop member 84 in the rectangular hole 83e (see FIG. 9) provided in the corresponding plate-shaped support shaft 83.

As shown in FIGS. 3 and 5, the horizontal turning/driving portion 40 is constituted of a transmission gear portion 41 for rotating the turntable 31 provided on the base 30 in the horizontal direction (along arrow A or B in FIG. 1) in the horizontal plane and a stepping motor 42 serving as the driving source of the transmission gear portion 41. The horizontal turning/driving portion 40 is arranged in the base 30, as shown in FIGS. 3 and 4. The transmission gear portion 41 is so formed that a gear 43 of resin, a torque limiter 75, another gear 44 of resin and still another gear 45 of resin are arranged in a gear box 46 of resin, as shown in FIG. 3.

Figure 7:
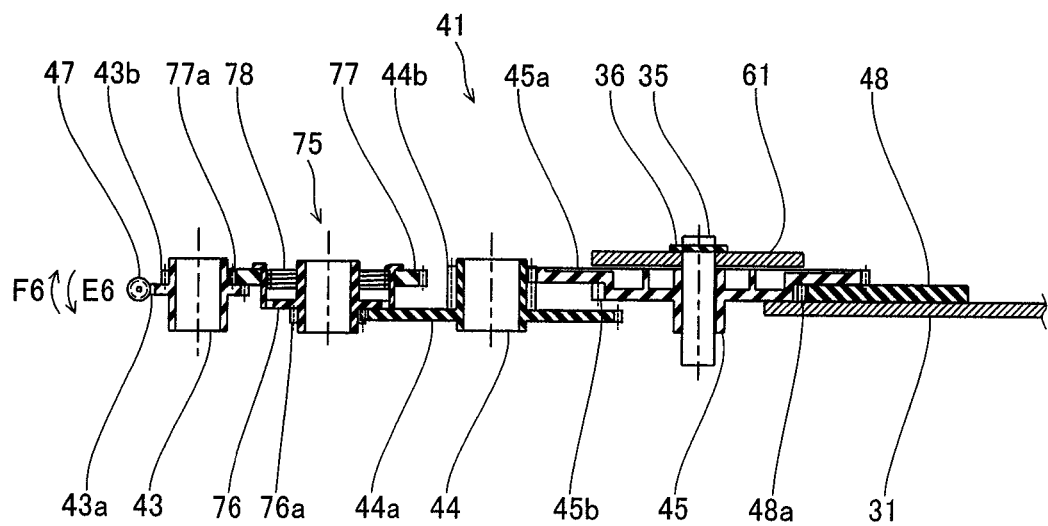
FIG. 7 is a diagram for illustrating the arrangement of a transmission gear portion in a horizontal turning/driving portion of the display screen turning apparatus according to the embodiment shown in FIG. 1.

A worm gear 47 of resin is press-fitted into the rotating shaft of the stepping motor 42, as shown in FIG. 5. The gear 43 integrally includes a large-diametral gear portion 43a and a small-diametral gear portion 43b, as shown in FIGS. 5 and 7. The gear 44 also integrally includes a large-diametral gear portion 44a and a small-diametral gear portion 44b. Further, the gear 45 also integrally includes a large-diametral gear portion 45a and a small-diametral gear portion 45b. A swing gear member 48 of resin is fixed to the upper surface 31a of the turntable 31 of the base 30 with four screws 90, as shown in FIGS. 3 and 5. Therefore, the driving force of the stepping motor 42 (see FIG. 5) is transmitted to the turntable 31 through the worm gear 47, the gear 43, the torque limiter 75, the gear 44, the gear 45 and the swing gear member 48, as shown in FIGS. 5 and 7. FIGS. 5 and 7 omit the gear box 46 (see FIG. 3) for storing the transmission gear portion 41 and the stepping motor 42 therein, in order to illustrate the arrangement of the transmission gear portion 41.

The torque limiter 75 is constituted of a driven gear 76 of resin, a driving gear 77 of resin and a spring member 78 (coil spring in this embodiment) of metal, as shown in FIGS. 3 and 7.

The display body 10 is constituted of a front cabinet 11 of resin and a rear cabinet 12 of resin, as shown in FIGS. 1 and 2. In the display body 10, a liquid crystal module 14 (see FIG. 4) mounted with a liquid crystal panel 13 (see FIG. 4) is enclosed with the front and rear cabinets 11 and 12. Screws 90 are clamped into screw mounting holes (not shown) of the rear cabinet 12 through the screw receiving holes 81c of the display screen support member 81, for mounting the display body 10 on the display screen support member 81. The rear cabinet 12 is integrally provided with a notch 12a for concealedly arranging the display screen support member 81 therein. A plurality of (seven in this embodiment) screw receiving holes 12b are provided on the outer periphery of the rear cabinet 12, so that the rear cabinet 12 is mounted on the front cabinet 11 with screws 91.

In the display screen turning apparatus 20, a cover member 21 of resin is mounted on the base member 34 with screws (not shown) inserted from the lower surface of the base member 34 of the base 30, as shown in FIGS. 1 and 4. Another cover member 22 of resin is mounted on the upper surface 31a of the turntable 31 with screws (not shown) to cover the base 30 from above and to be integrally turnable with the turntable 31 in the horizontal direction (along arrow A or B in FIG. 1), as shown in FIGS. 1 and 4. The cover member 22 of resin is provided with notches 22a for arranging the display screen support mechanism 80 (display screen support member 81) therein to be rotatable in the anteroposterior direction (along arrow C or D in FIG. 1), as shown in FIGS. 2 and 4.

The anteroposterior and horizontal turning operations of the display screen turning apparatus 20 according to the embodiment of the present invention are now described with reference to FIGS. 1, 3, 4, 6, 7 to 10, 12 and 15 to 28.

When the display screen turning apparatus 20 rotates the display screen support mechanism 80 in the anteroposterior direction (along arrow C or D) with respect to the vertical plane, the liquid crystal panel 13 of the display body 10 is rotated upward or downward, as shown in FIG. 4. Therefore, the anteroposterior direction is assumed to be the vertical direction in the following description.

First, the turning operation of the display screen turning apparatus 20 in the vertical direction (along arrow C or D in FIG. 1) is described.

In the state where the display screen support member 81 is perpendicular to the turntable 31 provided on the base 30 and directed frontward (the central portion of a swing gear portion 48a of the swing gear member 48 meshes with the small-diametral gear portion 45b of the gear 45) as shown in FIG. 3, the user presses an upward tilt button (not shown) of an attached remote control (not shown), thereby transmitting a signal for turning the display body 10 (see FIG. 1) upward (along arrow C in FIG. 1) to a control circuit portion (not shown) of the display body 10. Then, the stepping motor 52 is so driven as to rotate the worm gear 57 mounted thereon along arrow E1 (see FIG. 6) and to rotate the gear 53 along arrow E2, as shown in FIG. 3. Thus, the driving gear 72 and the driven gear 71 of the torque limiter 70 are rotated along arrow E3 through the gear 53. Further, the gears 54 and 55 are rotated along arrows E4 and E5 respectively.

Following the rotation of the gear 55 along arrow E5, the plate member 61 of the rack plate 60 starts moving along arrow P with the rack gear 62 horizontally meshing with the gear 55, as shown in FIG. 3. Thus, the engaging member 87 of the display screen support member 81 engaging with the engaging portion 63c of the lock lever 63 starts rotating along arrow C as shown in FIG. 4, whereby the display body 10 mounted on the display screen support member 81 starts turning upward (along arrow C).

Figure 16:
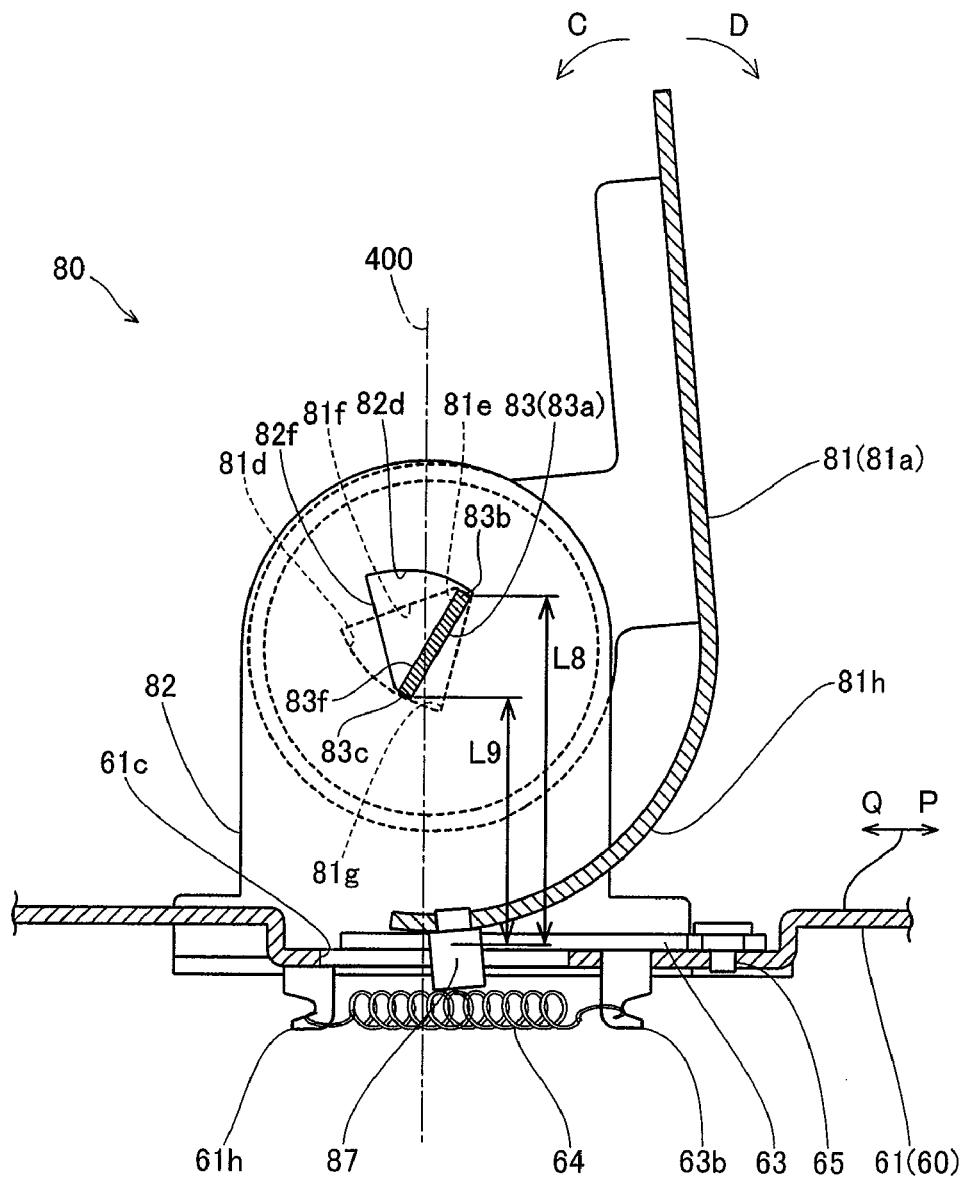

According to this embodiment, the side surface 83a of each support shaft 83 is in pressure contact with the first edge 82e (see FIG. 12) of the hole 82d of the corresponding base support member 82 due to the component W1 (see FIG. 12) of the vertical load W (see FIG. 12) of the display body 10 (see FIG. 4) transmitted through the root portion 81e of the corresponding hole 81d of the display screen support member 81 while the lower end surface 83c thereof is fitted with the root portion 82g (see FIG. 12) of the hole 82d of the base support member 82 substantially with no clearance as shown in FIG. 16, whereby the support shaft 83 is held in the state inclined from the vertical direction (shown by the line segment 400 (one-dot chain line)) by about 30°. Therefore, the display screen support member 81 for the display body 10 is rotated along arrow C around the contact portion between the root portion 81e of the hole 81d and the upper end surface 83b of the support shaft 83, as shown in FIG. 16. In other words, the rack plate 60 rotates the display screen support member 81 along arrow C, with the radius of rotation corresponding to the distance L8 between the root portion 81e and the engaging point between the engaging member 87 and the lock lever 63.

Figure 17:
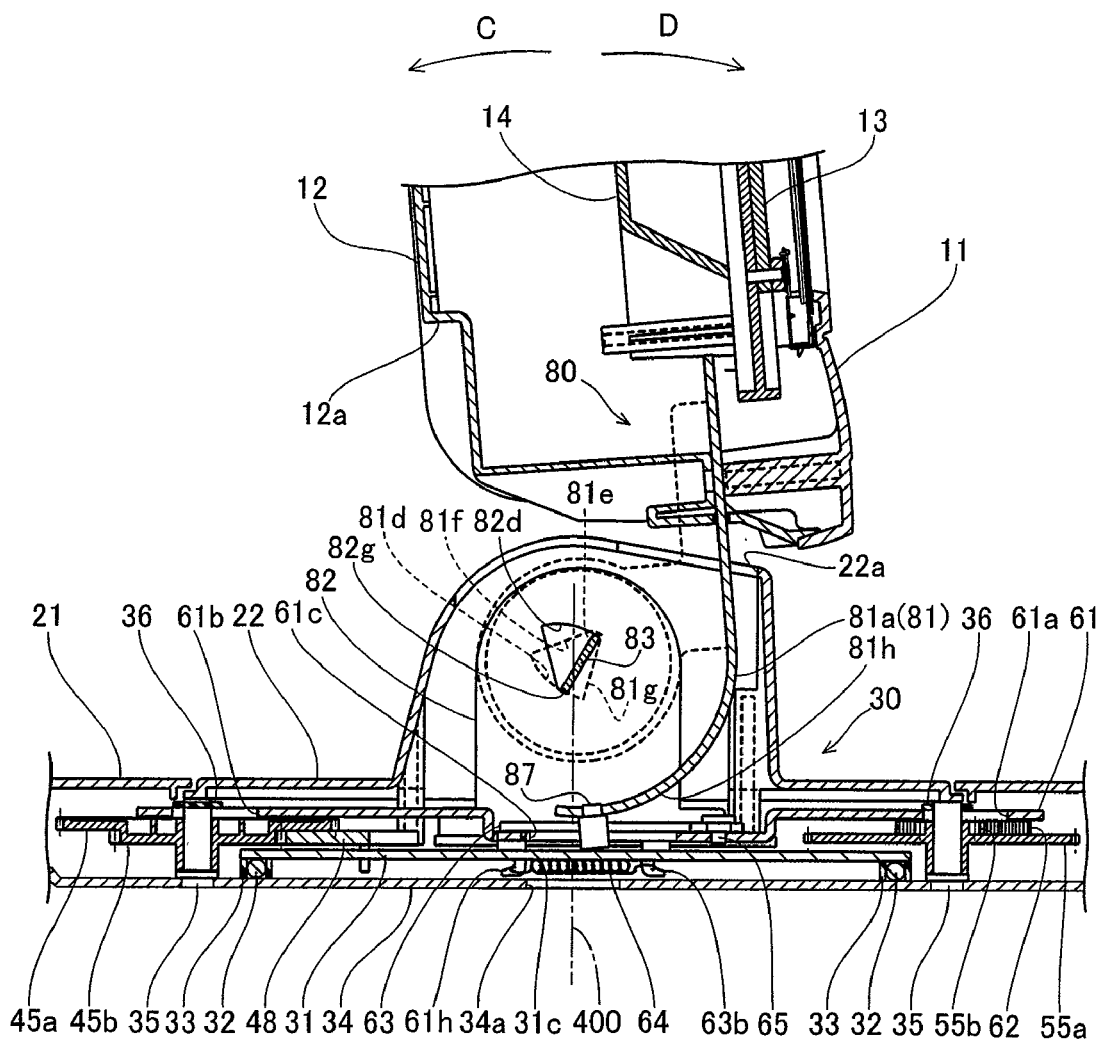

Following the driving of the stepping motor 52 (see FIG. 3), the display screen support member 81 mounted with the display body 10 continuously turns along arrow C at a prescribed turning speed, as shown in FIG. 17.

When the display body 10 is turned along arrow C in FIG. 4 up to a desired angle, the user stops pressing the upward tilt button (not shown) of the attached remote control (not shown), whereby the display screen support member 81 stops turning along arrow C on the position shown in FIG. 17.

Figure 15:
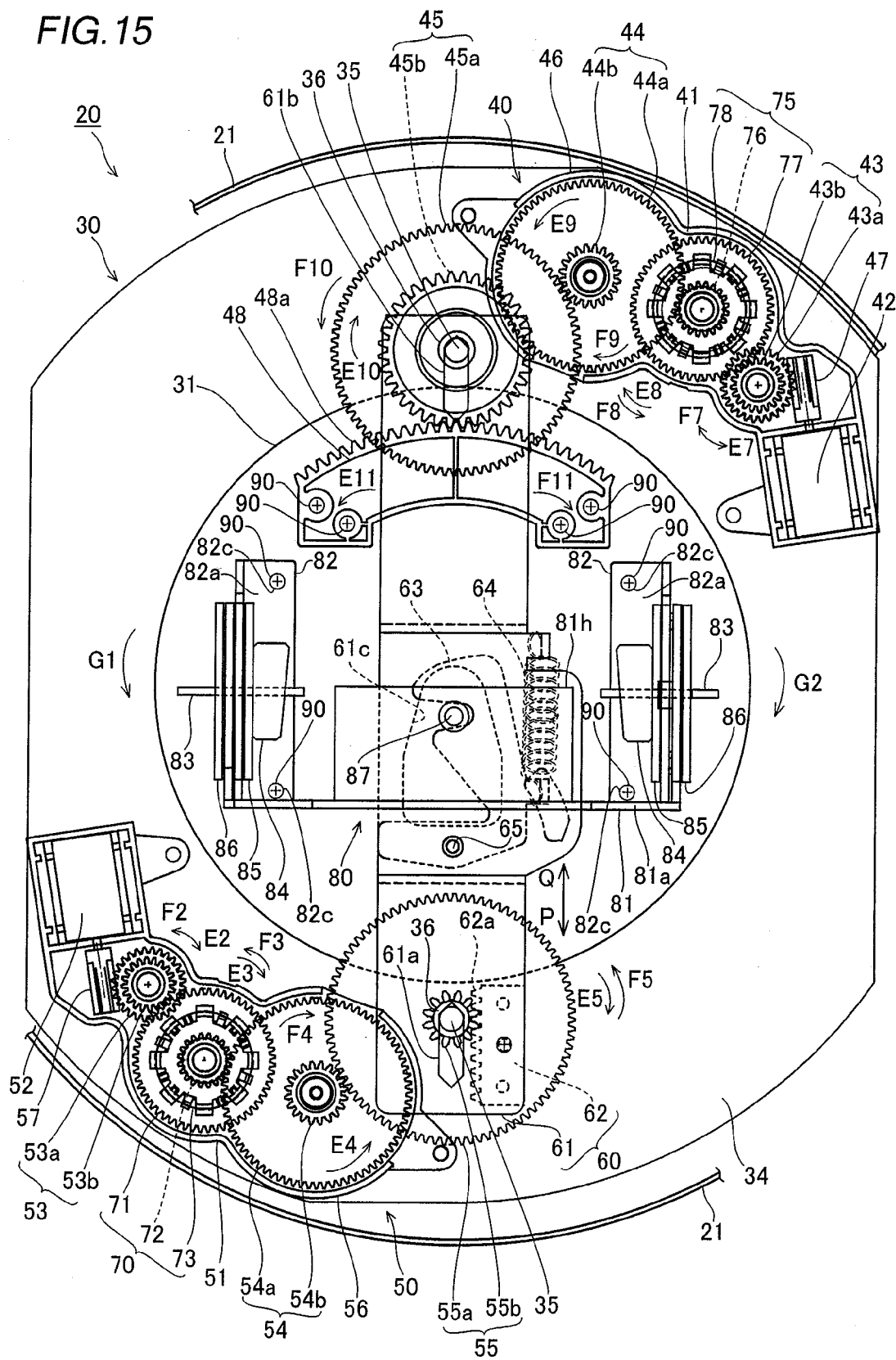
FIGS. 15 to 22 are diagrams for illustrating an anteroposterior (vertical) turning operation of the display screen turning apparatus according to the embodiment shown in FIG. 1.
Figure 18:
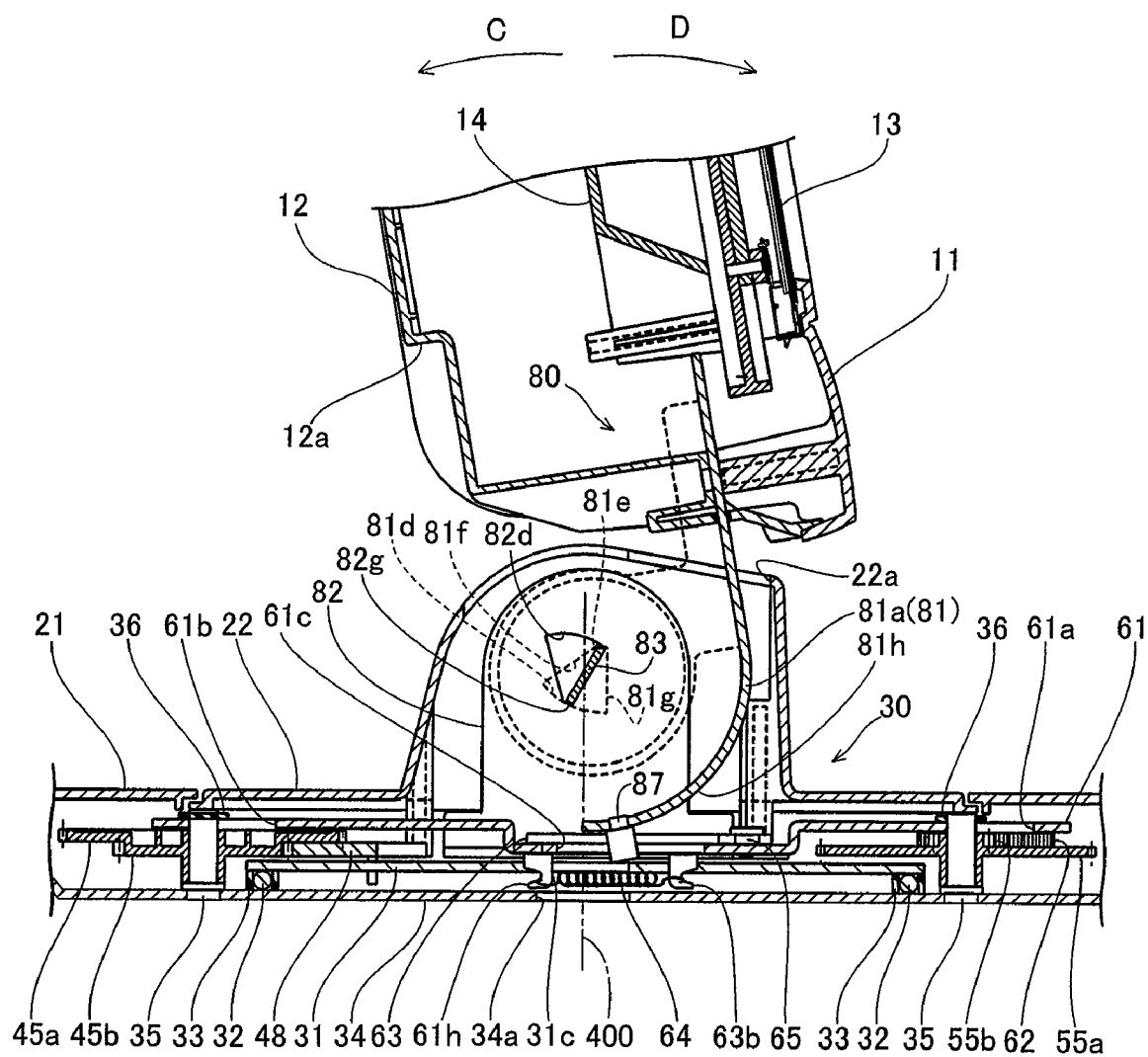

When the user continuously turns the display body 10 (see FIG. 17) upward (along arrow C in FIG. 17), the rack plate 60 slides along arrow P and first ends of the inner side surfaces of the slots 61a and 61b of the plate member 61 come into contact with the side surfaces of the boss members 35 respectively thereby inhibiting the rack plate 60 from sliding along arrow P, as shown in FIG. 15. At this time, the display screen support member 81 reaches a prescribed turning angle (about 10° in this embodiment), as shown in FIG. 18. Therefore, the display body 10 stops turning along arrow C on the position shown in FIG. 18. In the state shown in FIG. 18, the side surface 83a (see FIG. 16) of each support shaft 83 is not in contact with the first edge 81f of the corresponding hole 81d of the display screen support member 81.

At this time, the stepping motor 52 (see FIG. 15) is so continuously driven that the driving torque thereof is transmitted to the driving gear 72 (see FIG. 15) of the torque limiter 70 (see FIG. 15) through the worm gear 57 (see FIG. 15) and the gear 53 (see FIG. 15).

In the state where the display screen support member 81 is perpendicular to the turntable 31 provided on the base 30 and directed frontward as shown in FIG. 3, the user presses a downward tilt button (not shown) of the attached remote control (not shown), thereby transmitting a signal for turning the display body 10 (see FIG. 1) downward (along arrow D in FIG. 1) to the control circuit portion (not shown) of the display body 10 and driving the stepping motor 52 of the display screen turning apparatus 20. More specifically, the stepping motor 52 is so driven as to rotate the worm gear 57 mounted thereon along arrow F1 (see FIG. 6) and to rotate the driving gear 72 of the torque limiter 70 along arrow F3 through the gear 53, as shown in FIG. 3. Then, the driven gear 71 of the torque limiter 70 is rotated along arrow F3, and the gear 55 is rotated along arrow F5 through the gear 54, as shown in FIG. 3. Further, the rack plate 60 moves along arrow Q with the rack gear 62, as shown in FIG. 3. Thus, the engaging member 87 engaging with the engaging portion 63c of the lock lever 63 starts rotating along arrow D as shown in FIG. 4, whereby the display body 10 mounted on the display screen support member 81 starts turning downward (along arrow D) at a prescribed turning speed.

Figure 20:
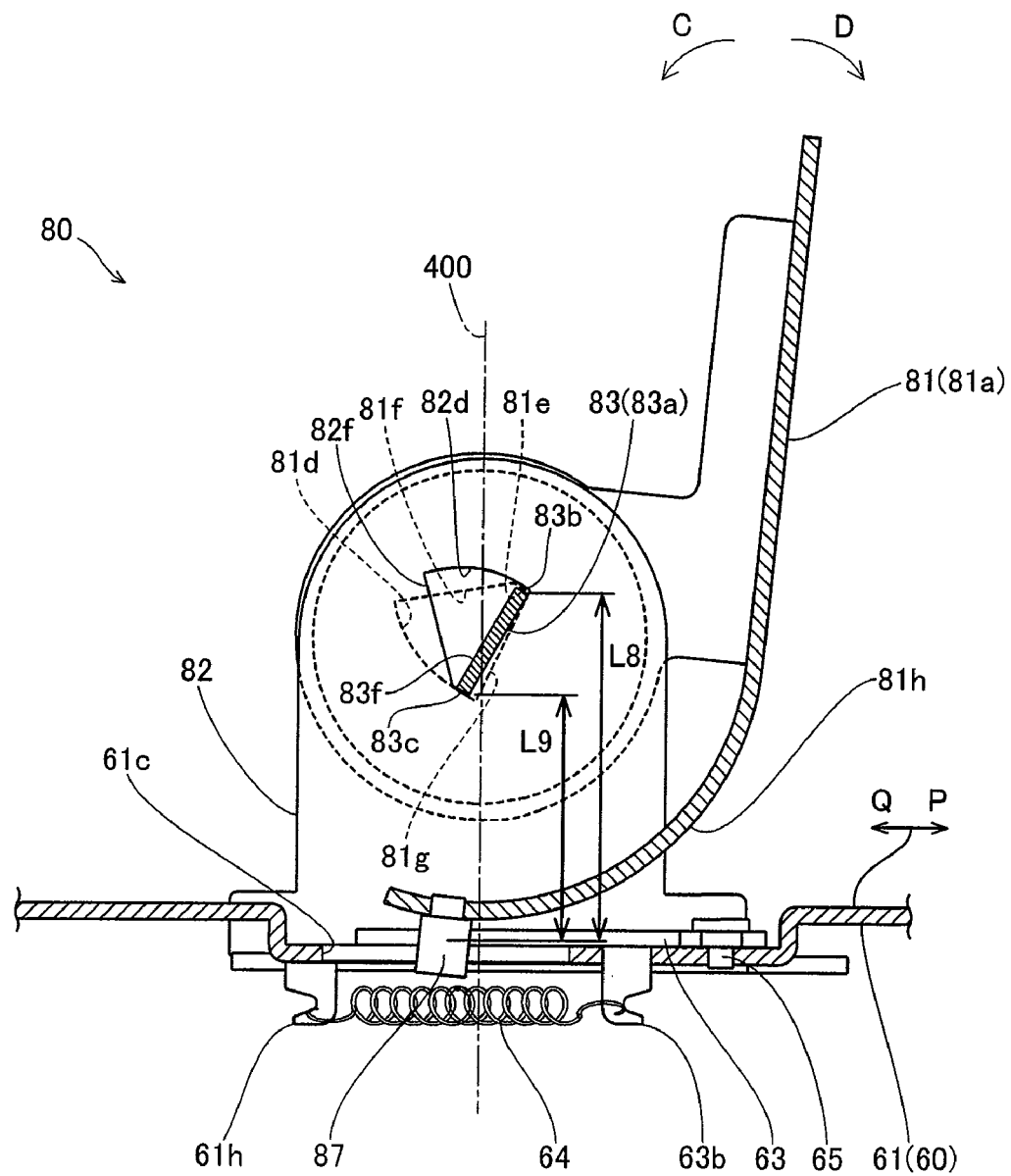

According to this embodiment, the side surface 83a of each support shaft 83 is in pressure contact with the first edge 82e (see FIG. 12) of the hole 82d of the corresponding base support member 82 due to the component W1 (see FIG. 12) of the vertical load W (see FIG. 12) of the display body 10 while the lower end surface 83c thereof is fitted with the root portion 82g (see FIG. 12) of the hole 82d of the base support member 82 substantially with no clearance as shown in FIG. 20, whereby the support shaft 83 is held in the state inclined from the vertical direction (shown by the line segment 400 (one-dot chain line)) by about 30°. Therefore, the display screen support member 81 for the display body 10 is rotated along arrow D around the contact portion between the root portion 81e of the hole 81d and the upper end surface 83b of the support shaft 83, as shown in FIG. 20. In other words, the rack plate 60 rotates the display screen support member 81 along arrow D, with the radius of rotation corresponding to the distance L8 between the root portion 81e and the engaging point between the engaging member 87 and the lock lever 63.

Following the driving of the stepping motor 52 (see FIG. 3), the display screen support member 81 mounted with the display body 10 continuously turns along arrow D at a prescribed turning speed, as shown in FIG. 17.

Figure 21:
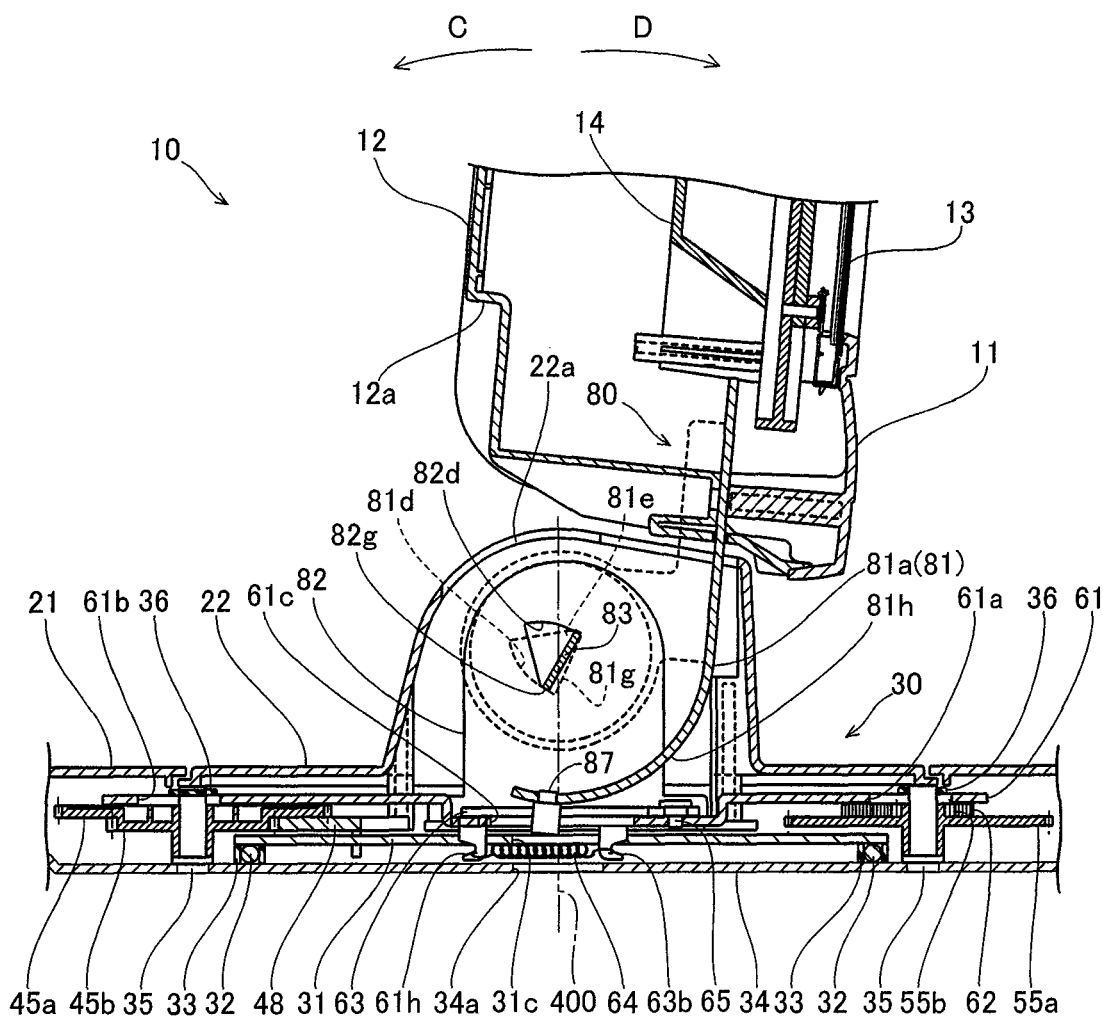

When the display body 10 is turned along arrow D in FIG. 4 up to a desired angle, the user stops pressing the downward tilt button (not shown) of the attached remote control (not shown), whereby the display screen support member 81 stops turning along arrow D on the position shown in FIG. 21.

Figure 19:
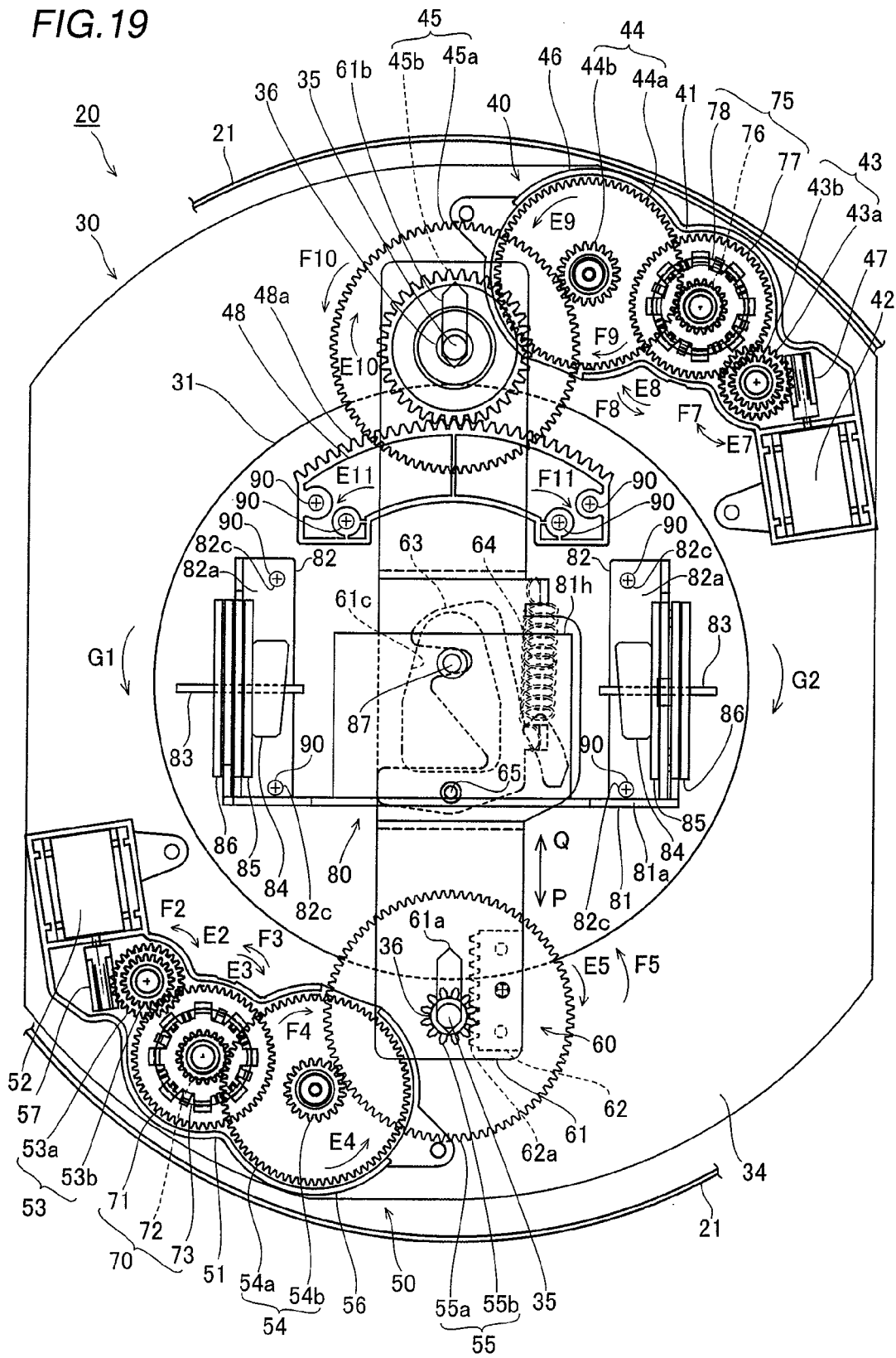
Figure 22:
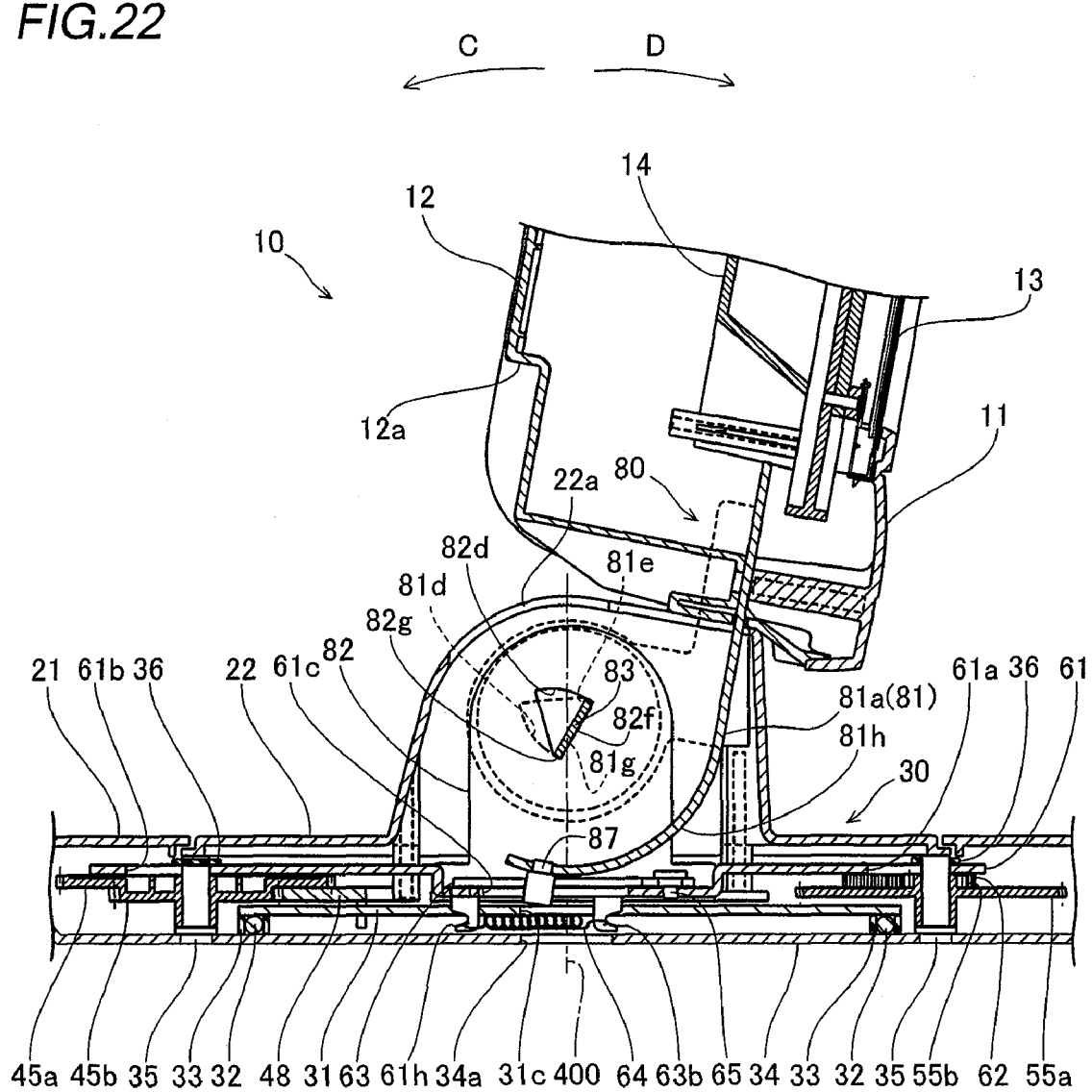

When the user continuously turns the display body 10 (see FIG. 21) along arrow D (see FIG. 21), the side surface 83a (see FIG. 16) of each support shaft 83 comes into contact with the second edge 81g of the corresponding sectorial hole 81d of the display screen support member 81 as shown in FIG. 22, whereby the display screen support member 81 reaches the prescribed turning angle (about 10° in this embodiment) and inhibited from the rotation along arrow D. At this time, the second ends of the inner side surfaces of the slots 61a and 61b of the plate member 61 come into contact with the side surfaces of the boss members 35 respectively thereby inhibiting the rack plate 60 from sliding along arrow Q, as shown in FIG. 19. Therefore, the display body 10 stops turning along arrow D on the position shown in FIG. 22. At this time, the stepping motor 52 (see FIG. 19) is still continuously driven so that the driving torque thereof is transmitted to the driving gear 72 (see FIG. 19) of the torque limiter 70 (see FIG. 19) through the worm gear 75 (see FIG. 19) and the gear 53 (see FIG. 19).

In the turning operation of the display screen turning apparatus 20 in the vertical direction (along arrow C or D in FIG. 1), the user can also rotate the display body 10 by directly pressing the same, in place of the aforementioned turning operation with the attached remote control (not shown). The operation of manually turning the display body 10 in the vertical direction (along arrow C or D in FIG. 1) is now described.

Figure 23:
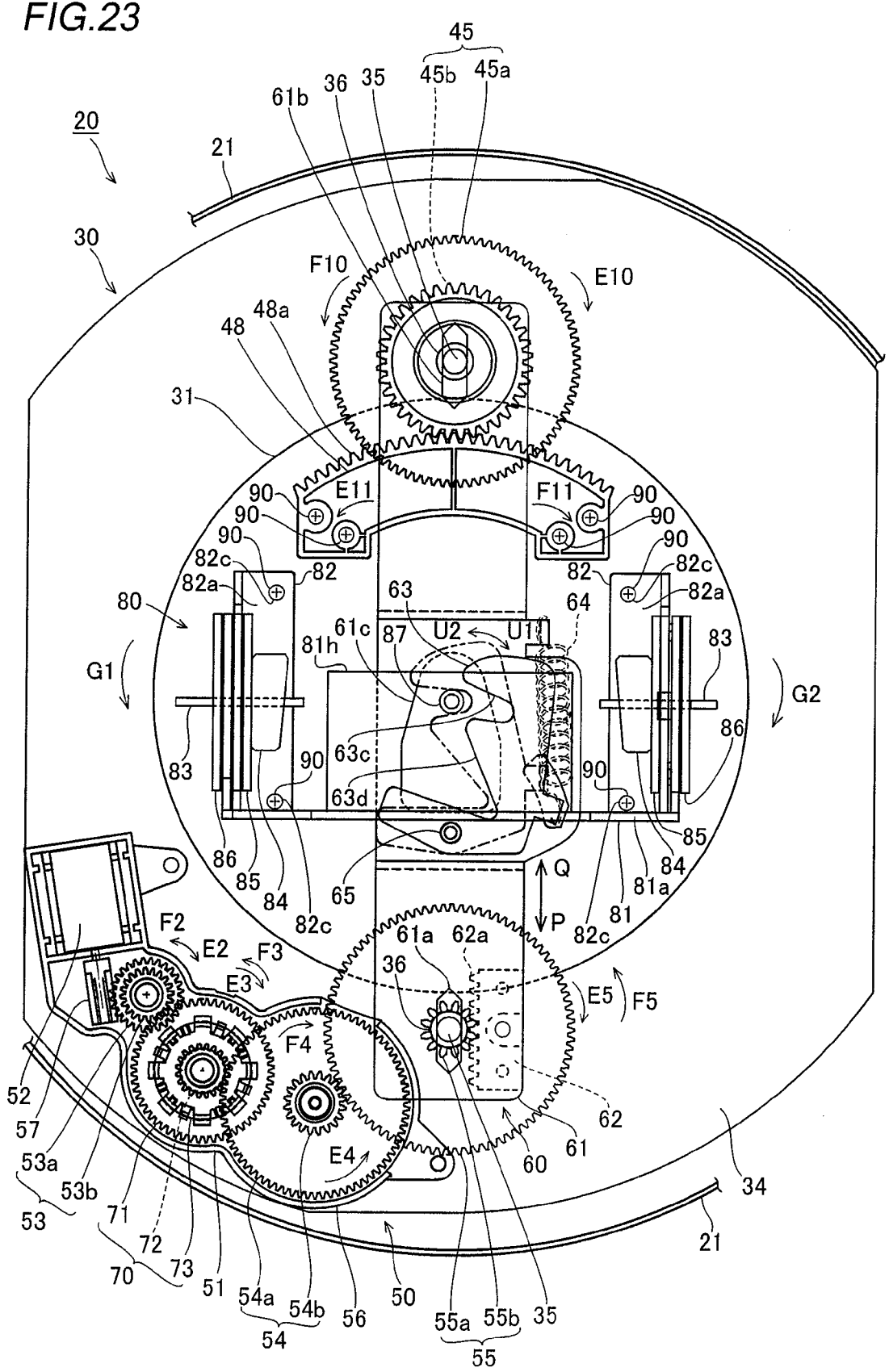
FIG. 23 is a diagram for illustrating an operation of a lock lever of the rack plate of the display screen turning apparatus according to the embodiment shown in FIG. 1.

In the state where the display body 10 is vertically placed on the display screen turning apparatus 20 as shown in FIG. 4, the user inserts his/her finger into a hole 34a provided in the base member 34 and the hole 31c of the turntable 31 from the rear side of the base 30, thereby moving (rotating) the lock lever 63 along arrow U1 (see FIG. 23). At this time, the lock lever 63 is rotated from the position shown by a two-dot chain line to the position shown by a solid line, as shown in FIG. 23.

Then, the engaging portion 63c of the lock lever 63 disengages from the engaging member 87 of the display screen support member 81 along arrow U1 thereby releasing the display screen support member 81 and the rack plate 60 from the engaging state, as shown in FIG. 23. The engaging member 87 is freely rotatable without interfering with the plate member 61 due to the hole 61c provided in the plate member 61, as shown in FIG. 23.

In the state where the display screen support member 81 is vertically supported with respect to the display screen turning apparatus 20 as shown in FIG. 4, the user presses the display body 10 supported by the display screen support member 81 along arrow C.

According to this embodiment, the display screen support member 81 is rotated along arrow C around the root portion 81e of each hole 81d while each support shaft 83 is held in the state inclined from the vertical direction (shown by the line segment 400 (one-dot chain line) in FIG. 16) by about 30° as shown in FIG. 16, similarly to the above. In other words, the display screen support member 81 is rotated along arrow C with the radius of rotation corresponding to L8.

Figure 24:
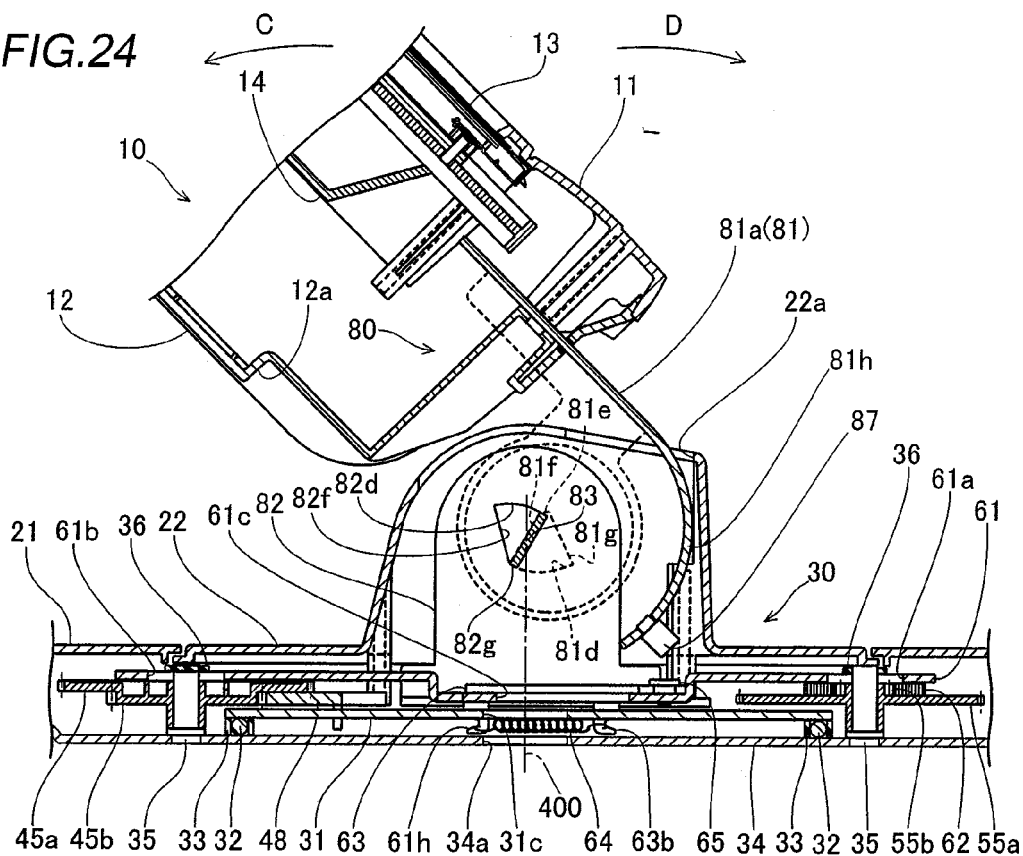
FIGS. 24 and 25 are diagrams for illustrating the anteroposterior (vertical) turning operation of the display screen turning apparatus according to the embodiment shown in FIG. 1.

When the user rotates the display screen support member 81 by about 45° (corresponding to the angle α1 shown in FIG. 10), the side surface 83a (see FIG. 16) of each support shaft 83 comes into contact with the first edge 81f of the corresponding sectorial hole 81d of the display screen support member 81, as shown in FIG. 24.

Figure 25:
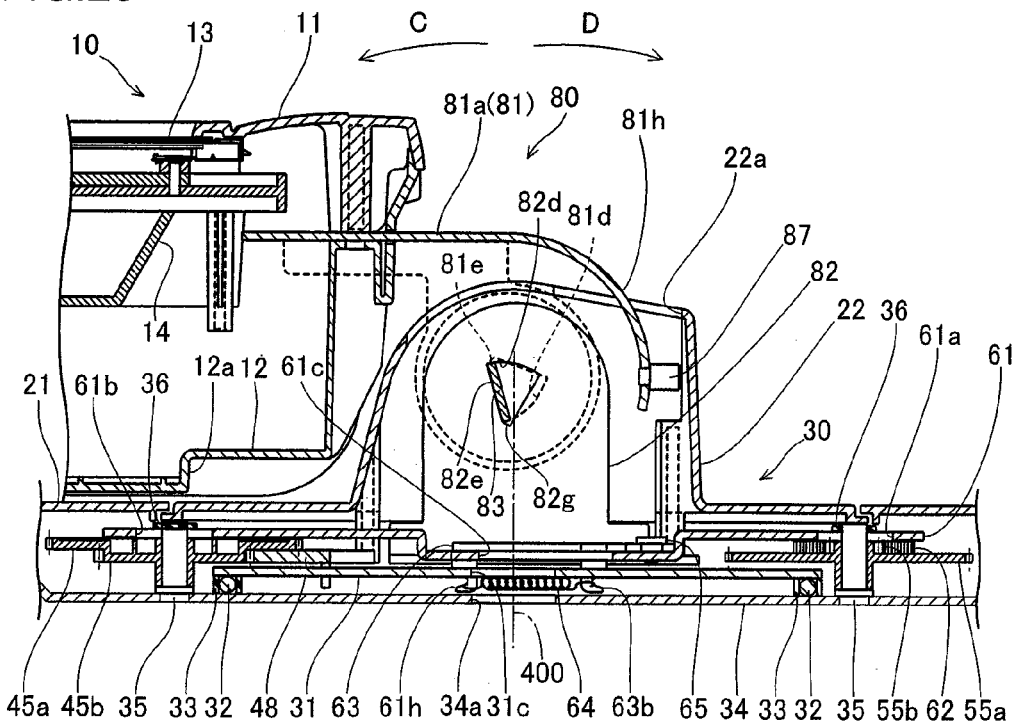

When the user further presses the display body 10 along arrow C in this state, the display screen support member 81 and each support shaft 83 are continuously rotated along arrow C around the root portion 82g of the sectorial hole 82d of the corresponding base support member 82, as shown in FIG. 24. At this time, the display screen support member 81 is rotated along arrow C with a radius of rotation corresponding to the distance L9 (see FIG. 16) between the root portion 82g and the engaging point between the engaging member 87 and the lock lever 63. When the display screen support member 81 and each support shaft 83 are further rotated along arrow C by about 45° (corresponding to the angle α2 shown in FIG. 10), the side surface 83f (see FIG. 16) of the support shaft 83 comes into contact with the second edge 82f of the sectorial hole 82d of the corresponding base support member 82 as shown in FIG. 25, whereby the support shaft 83 is inhibited from further rotation along arrow C. Thus, according to this embodiment, the display body 10 can be rotated upward (along arrow C) up to about 90°, as shown in FIG. 25. During the aforementioned operation, the lock lever 63 remains on the original position shown in FIG. 8 due to the tensile stress of the spring member 64.

Figure 26:
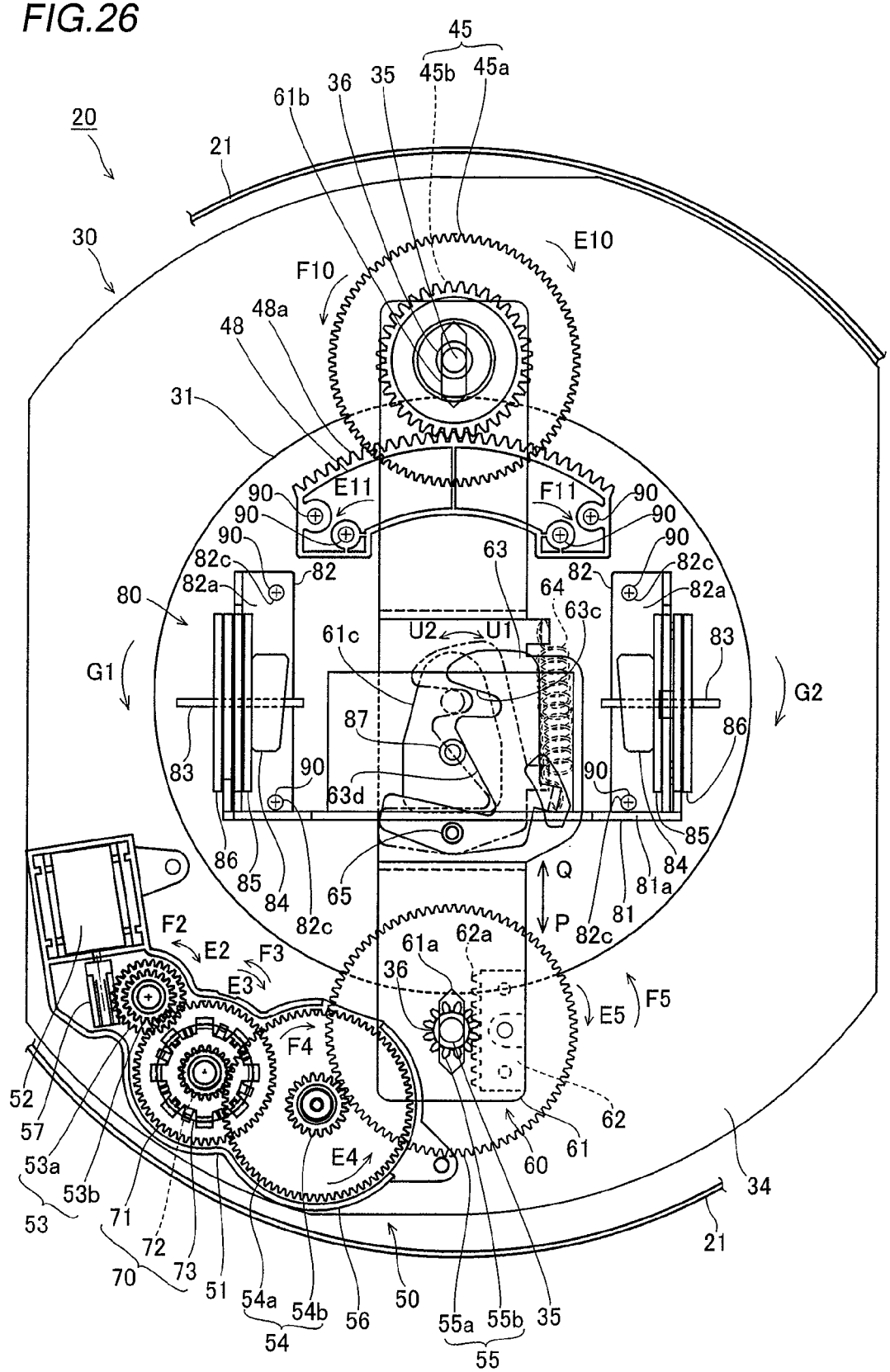
FIG. 26 is a diagram for illustrating the operation of the lock lever of the rack plate of the display screen turning apparatus according to the embodiment shown in FIG. 1.

From the state shown in FIG. 25, the user can rotate the display body 10 to the vertical state contrarily to the above, by pressing the display body 10 along arrow D. When the user rotates the display body 10 along arrow D from the horizontal position up to a prescribed angle (about 80° in this embodiment) as shown in FIG. 24, the engaging member 87 of the display screen support member 81 lowers onto the guide portion 63d of the lock lever 63 obliquely from above, whereby the side surface of the engaging member 87 starts gradually coming into contact with the guide portion 63d of the lock lever 63. At this time, the engaging member 87 moves (rotates) along arrow Q along the guide portion 63d while the lock lever 63 rotates from the original position (shown by a two-dot chain line) along arrow U1 by a small angle, as shown in FIG. 26. In this state, the display body 10 is rotated along arrow D by the remaining angle of about 10°, to be vertically supported with respect to the display screen turning apparatus 20 as shown in FIG. 4. Then, the engaging member 87 reaches the engaging portion 63c over the guide portion 63d of the lock lever 63 along arrow Q while the lock lever 63 is rotated along arrow U2 due to the tensile force of the spring member 64, as shown in FIG. 23. In other words, the lock lever 63 is returned to the position shown by the two-dot chain line. Consequently, the engaging member 87 reengages with the engaging portion 63c, as shown in FIG. 3.

The horizontal turning operation of the display screen turning apparatus 20 in the horizontal plane is now described.

Figure 27:
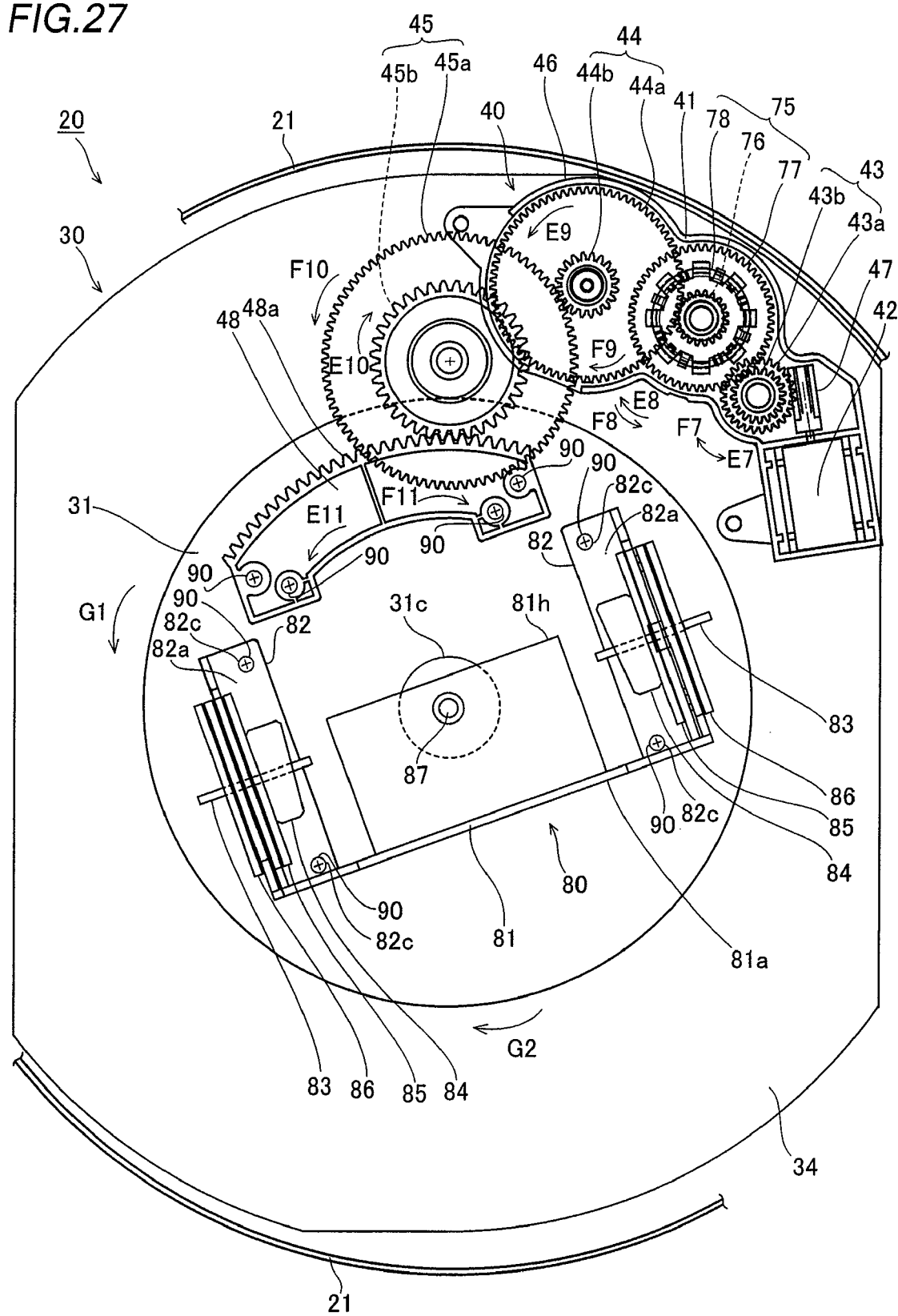
FIGS. 27 and 28 are diagrams for illustrating a horizontal turning operation of the display screen turning apparatus according to the embodiment shown in FIG. 1.

First, the user presses a horizontal turn button (not shown) of the attached remote control (not shown) thereby driving the stepping motor 42 of the display screen turning apparatus 20, as shown in FIG. 3. From the state shown in FIG. 3, the turntable 31 mounted with the display screen support member 81 starts turning along arrow G1 through the transmission gear portion 41 as shown in FIG. 27, whereby the display body 10 (see FIG. 1) starts turning rightward (along arrow A in FIG. 1). FIG. 27 omits the vertical turning/driving portion 50 (see FIG. 3), in order to illustrate the horizontal turning operation of the turntable 31.

At this time, the engaging member 87 of the display screen support member 81 is arranged on the rotation centers of the turntable 31 and the display screen support member 81 in the horizontal direction (along arrow G1 or G2) as shown in FIG. 9, to remain unmoving on the rotation centers regardless of the turning operation of the turntable 31. Therefore, the rack plate 60 engaging with the engaging member 87 does not linearly move (slide) along arrow P or Q, as shown in FIG. 3.

When the display body 10 is turned to a desired angle, the user stops pressing the horizontal turn button (not shown) of the attached remote control (not shown), whereby the turntable 31 stops turning along arrow G1 on the position shown in FIG. 27.

Figure 28:
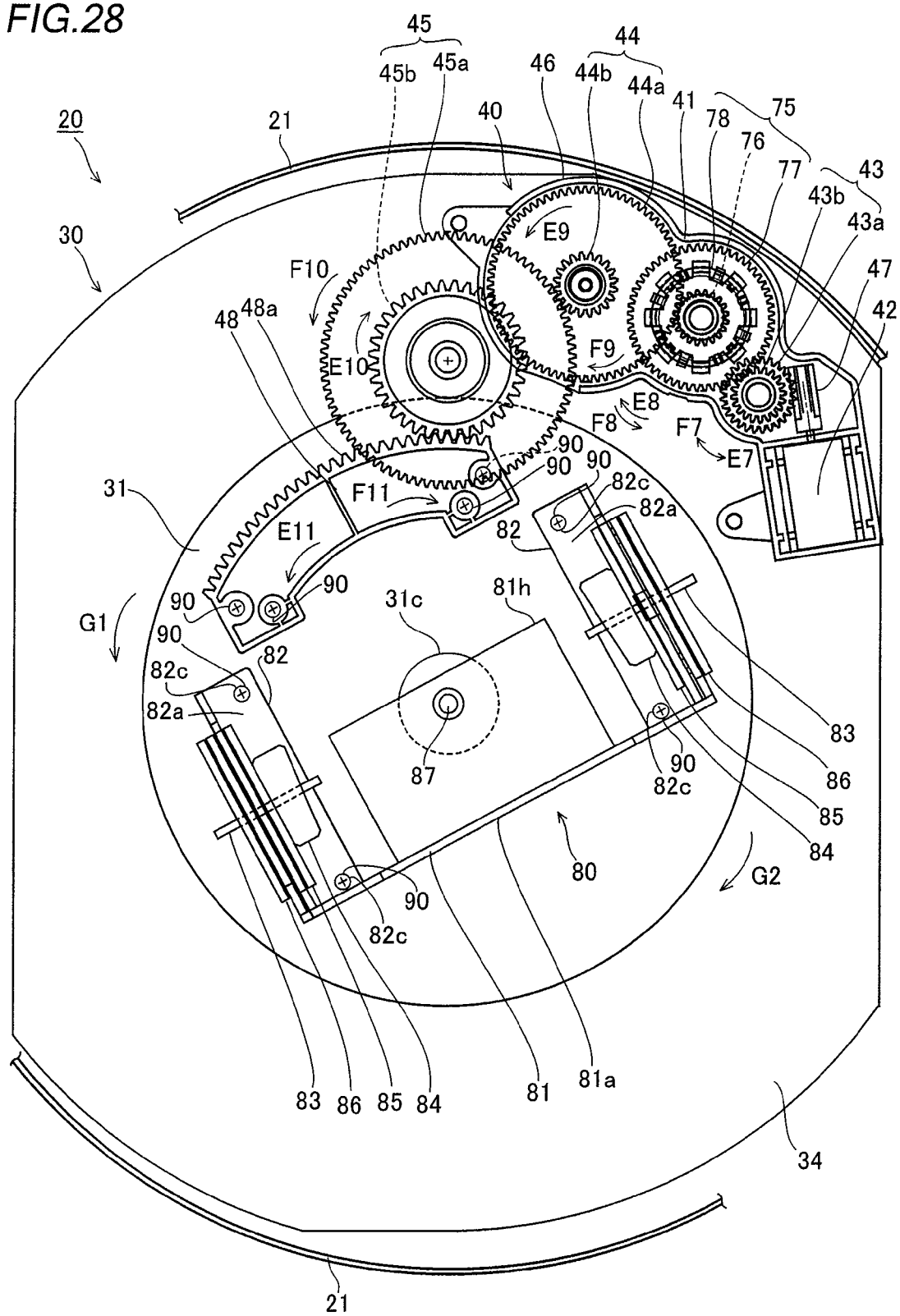

When the turning angle of the base 30 reaches the maximum (about 30° in this embodiment) while the user continuously turns the display body 10 (see FIG. 1) rightward (along arrow A in FIG. 1), the turntable 31 comes into contact with a stopper member (not shown) provided in the base 30, to be inhibited from further turning along arrow A (see FIG. 1). Therefore, the turntable 31 stops turning along arrow G1 on the position shown in FIG. 28. FIG. 28 omits the vertical turning/driving portion 50 (see FIG. 3) in order to illustrate the horizontal turning operation of the turntable 31, similarly to FIG. 27.

While the case of turning the base 30 along G1 shown in FIGS. 27 and 28 has been described, the horizontal turning/driving portion 40 performs a turning operation similar to the above, in order to turn the turntable 31 along arrow G2 contrarily to the above. In this case, the turntable 31 is so turned along arrow G2 as to turn the display body 10 (see FIG. 1) leftward (along arrow B in FIG. 1).

According to this embodiment, the display body 10 turned in the horizontal direction (along arrow A or B in FIG. 1) by a prescribed angle from the state vertically placed on the base 30 can be further turned in the vertical direction (along arrow C or D in FIG. 1). Also in this case, the display screen support mechanism 80 turns the display body 10 (see FIG. 1) in the vertical direction (along arrow C or D in FIG. 1) by an operation similar to the above.

Also when the turntable 31 is turned in the horizontal direction (along arrow G1 or G2) by a prescribed angle as shown in FIGS. 27 and 28, the user can manually turn the display screen support member 81 in the vertical direction (along arrow C or D in FIG. 4) by operating the lock lever 63, similarly to the above.

According to this embodiment, as hereinabove described, the display screen turning apparatus 20 comprises the display screen support member 81, including the sectorial holes 81*d* receiving the plate-shaped support shafts 83, rotatable around the upper end surfaces 83*b* of the plate-shaped support shafts 83 and the base support members 82, including the sectorial holes 82*d* receiving the plate-shaped support shafts 83, provided on the side of the base 30 so that the root portions 81*e* of the sectorial holes 81*d* closer to the centers of the circles are arranged on the upper sides of the holes 81*d* and the root portions 82*g* of the sectorial holes 81*d* closer to the centers of the circles are arranged on the lower sides of the holes 82*d* while the side surfaces 83*a* of the plate-shaped support shafts 83 inserted into the sectorial holes 81*d* come into contact with the first edges 82*e* of the sectorial holes 82*d* of the base support members 82 when the display body 10 is vertically arranged with respect to the horizontal plane along with the display screen support member 81, whereby the support shafts 83 come into contact with the first edges 82*e* of the holes 82*d* of the base support members 82 not to move with respect to the holes 82*d* and the display screen support member 81 is rotated around the root portions 81*e* provided on the upper sides of the holes 81*d* of the display screen support member 81 with respect to the support shafts 83 when the display body 10 is rotated in the vertical direction (along arrow C or D in FIG. 1) from the vertically arranged state through the driving force of the stepping motor 52 and the transmission gear portion 51. Thus, the distance (corresponding to L8 in FIG. 16) between the engaging member 87 engaging with the rack plate 60 arranged under the display screen support member 81 and the rotation center of the display screen support member 81 can be increased as compared with the case of rotating the display screen support member 81 around the root portions 82*g* provided on the lower sides of the holes 82*d* of the base support members 82 with the radius of rotation L9 (see FIG. 16), thereby reducing influence exerted by a clearance in a gear train (jolting resulting from the clearance) included in the transmission gear portion 51 on the rotation angle (α1) of the display body 10. Therefore, the radius of rotation of the display screen support member 81 can be increased without changing the sizes of the support shafts 83 and the display screen support member 81 in order to suppress influence exerted by the clearance in the gear train, whereby the display screen turning apparatus 20 can be inhibited from size increase.

According to this embodiment, the side surfaces 83*a* of the plate-shaped support shafts 83 inserted into the sectorial holes 81*d* are inclined by about 30° with respect to the vertical direction (shown by the line segment 400 in FIG. 10) to come into contact with the first edges 82*e* of the sectorial holes 82*d* of the base support members 82 when the display body 10 is vertically arranged with respect to the horizontal plane along with the display screen support member 81 so that the side surfaces 83*a* of the plate-shaped support shafts 83 can come into contact with the first edges 82*e* of the sectorial holes 82*d* provided in the base support members 82 due to the component W1 of the own weight (vertical load W in FIG. 12) of the display body 10, whereby the display body 10 is kept in the vertically arranged state by the support shafts 83 and inhibited from easy rotation. Therefore, the display body 10 of the liquid crystal display 100 can be inhibited from unnecessary jolting.

According to this embodiment, the root portions 81*e* of the sectorial holes 81*d* of the display screen support member 81 are rotated around the upper end surfaces 83*b* of the plate-shaped support shafts 83 from the state where the display body 10 is vertically arranged with respect to the horizontal plane along with the display screen support member 81 thereby rotating the display body 10 upward (rearward) by the angle α1 (about 45°), whereby the user can finely adjust the rotation angle (α1) of the display body 10 with respect to the quantity of sliding (along arrow P or Q) of the rack plate 60 when adjusting the direction of the display body 10 in the range of the angle α1 (0° to about 45°) from a state substantially parallelly facing the display body 10, due to the long distance L8 (see FIG. 16) between the engaging member 87 engaging with the rack plate 60 having the vertical turning/driving portion 50 arranged on the lower side of the display screen support member 81 as the driving source and the root portions 81*e* serving as the rotation centers of the display screen support member 81.

According to this embodiment, the plate-shaped support shafts 83 are inclined by about 30° from the vertical direction (shown by the line segment 400 in FIG. 10) in the state where the display body 10 is vertically arranged so that the side surfaces 83*a* of the plate-shaped support shafts 83 are so pressed as to come into contact with the first edges 82*e* of the sectorial holes 82*d* of the base support members 83 due to the component W1 (see FIG. 12), perpendicular to the side surfaces 83*a* of the plate-shaped support shafts 83, included in the vertical load W (see FIG. 12) resulting from the own weight of the display body 10, whereby the support shafts 83 can easily come into contact with the first edges 82*e* of the holes 82*d* of the base support members 82 due to the component W1 of the vertical load W when the vertical load W resulting from the own weight of the display body 10 is applied to the plate-shaped support shafts 83. Therefore, rotation of the support shafts 83 can be reliably regulated when the display body 10 is vertically arranged.

According to this embodiment, the plate-shaped support shafts 83 include the upper end surfaces 83*b* formed in the direction perpendicular to the thickness direction and the lower end surfaces 83*c* formed on the side opposite to the upper end surfaces 83*b* and are inclined by about 30° from the vertical direction (shown by the line segment 400 in FIG. 10) in the state where the display body 10 is vertically arranged so that the lower end surfaces 83*c* of the plate-shaped support shafts 83 are so pressed as to come into contact with the root portions 82*g* of the sectorial holes 82*d* of the base support members 82 due to the component W2 (see FIG. 12), in the direction along the side surfaces 83*a* of the plate-shaped support shafts 83, included in the vertical load W (see FIG. 12) resulting from the own weight of the display body 10, whereby the support shafts 83 can easily come into contact with the root portions 82*g* of the holes 82*d* of the base support members 82 due to the component W2 of the vertical load W when the vertical load W resulting from the own weight of the display body 10 is applied to the plate-shaped support shafts 83. Therefore, rotation of the support shafts 83 can be reliably regulated when the display body 10 is vertically arranged.

According to this embodiment, the plate-shaped support shafts 83 receive the own weight of the display body 10 on the lower end surfaces 83*c* so that the plate-shaped support shafts 83 can receive the own weight of the display body 10 on the stronger lower end surfaces 83*c* in the direction perpendicular to the thickness direction, whereby the plate-shaped support shafts 83 can be inhibited from deformation resulting from the own weight of the display body 10.

According to this embodiment, the line segment 500 connecting the root portion 81*e* of each sectorial hole 81*d* of the display screen support member 81 closer to the center of the circle and the root portion 82g of the sectorial hole 82d of the corresponding base support member 82 closer to the center of the circle is inclined by about 30° with respect to the vertical direction (shown by the line segment 400 in FIG. 10) when the display body 10 is vertically arranged with respect to the horizontal plane along with the display screen support member 81, whereby the support shaft 83 can be kept in the state inclined by about 30° due to the root portion 81e of the hole 81d of the display screen support member 81 and the root portion 82g of the hole 82d of the base support member 82 when the display body 10 is vertically arranged.

According to this embodiment, the plate-shaped support shafts 83 are kept in the state where the upper end surfaces 83b and the lower end surfaces 83c are held by the root portions 81e of the sectorial holes 81d of the display screen support member 81 and the root portions 82g of the sectorial holes 82d of the base support members 82 respectively so that the plate-shaped support shafts 83 are regularly held by the root portions 81e of the display screen support member 81 and the root portions 82g of the base support members 82 regardless of the rotation angle (−10° (downward) to +900 (upward)) of the display body 10, whereby the support shafts 83 can be easily inhibited from axial displacement upon rotation.

According to this embodiment, the display body 10 is so formed that the root portions 81e of the sectorial holes 81d of the display screen support member 81 are rotated downward (along arrow D) or upward (along arrow C) around the upper end surfaces 83b, serving as the rotation centers, of the plate-shaped support shafts 83 until the side surfaces 83a or 83f of the plate-shaped support shafts 83 come into contact with the first or second edges 81f or 81g of the sectorial holes 81d of the display screen support member 81, whereby the side surfaces 83a or 83f of the plate-shaped support shafts 83 and the first or second edges 81f or 81g of the holes 81d of the display screen support member 81 so come into contact with each other as to reliably stop downward (frontward) or upward (rearward) rotation of the display body 10.

According to this embodiment, the display body 10 is rotated upward (rearward) by the angle α1 (about 45°) along with the display screen support member 81 from the state where the root portions 81e of the sectorial holes 81d of the display screen support member 81 are rotated around the upper end surfaces 83b, serving as the rotation centers, of the plate-shaped support shafts 83 and thereafter so switched that the lower end surfaces 83c of the plate-shaped support shafts 83 are rotated around the root portions 82g, serving as the rotation centers, of the sectorial holes 82d of the base support members 82 to be further rotated upward (rearward) (along arrow C) by the angle α2 (about 45°) so that the user can further rotate the display body 10 by the angle α2 (about 45°) when it is necessary to rotate the display body 10 upward (rearward) from the state vertically arranged with respect to the horizontal plane to a position exceeding the angle α1 (about 45°), whereby the display screen turning apparatus 20 can be improved in user-friendliness.

According to this embodiment, the plate-shaped support shafts 83 are rotated around the lower end surfaces 83c, serving as the rotation centers, of the plate-shaped support shafts 83 inside the sectorial holes 82d of the base support members 82 when the display body 10 is rotated by the angle α2 (about 45°) along with the display screen support members 83 so that the display body 10 is rotated along with the display screen support member 81. Therefore, the plate-shaped support shafts 83 are integrally rotated with the display screen support member 81 when the display body 10 is rotated by the angle α2 (about 45°), whereby the plate-shaped support shafts 83 can easily serve as rotating shafts.

According to this embodiment, the display body 10 is rotated upward (rearward) (along arrow C) by the angles α1 (about 45°) and α2 (about 45°) to the state arranged substantially parallelly to the horizontal plane from the state vertically arranged with respect to the horizontal plane along with the display screen support member 81 so that the display body 10 can be tilted rearward up to about 90° from the state vertically arranged with respect to the horizontal plane, whereby the user can compactly store the liquid crystal television 100 when moving the liquid crystal television 100 or not using the same.

According to this embodiment, the display screen support member 81 is rotated in the state where the arcuate portions of the sectorial holes 81d of the display screen support member 81 are not in contact with the lower end surfaces 83c of the plate-shaped support shafts 83 when the display body 10 is rotated by the angle α1 (about 45°) while the plate-shaped support shafts 83 are rotated with the display screen support member 81 in the state where the arcuate portions of the sectorial holes 82d of the base support members 82 are not in contact with the upper end surfaces 83b of the plate-shaped support shafts 83 when the display body 10 is rotated by the angle α2 (about 45°) so that the upper end surfaces 83b of the plate-shaped support shafts 83 and the root portions 81e of the holes 81d of the display screen support member 81 come into contact with each other when the display screen support member 81 is rotated by the angle α1 (about 45°) while the lower end surfaces 83c of the plate-shaped support members 83 and the root portions 82g of the holes 82d of the base support members 82 come into contact with each other when the plate-shaped support shafts 83 are rotated by the angle α2 (about 45°), whereby the display body 10 can be smoothly rotated.

According to this embodiment, the radial lengths L1 and L2 of the sectorial holes 81d and 82d are larger than the radial width L5 (see FIG. 13) of the plate-shaped support shafts 83 respectively, whereby the upper and lower end surfaces 83b and 83c of the support shafts 83 can be inhibited from coming into contact with the arcuate portions of the holes 82d and 81d respectively upon rotation of the display screen support member 81. Therefore, the display screen support member 81, the base support members 82 and the support shafts 83 do not jolt when the display body 10 is rotated in the vertical direction (along arrow C or D in FIG. 1) with respect to the vertical plane, whereby the display body 10 can be stably rotated.

According to this embodiment, the thickness t1 of the plate-shaped support shafts 83 and the widths L3 (see FIG. 11) and L4 (see FIG. 12) of the root portions 81e and 82f of the sectorial holes 81d and 82d in the thickness direction of the support shafts 83 are substantially equal to each other (t1=L3=L4), whereby the support shafts 83 inserted into the display screen support member 81 and the base support members 82 can be inhibited from deviating from the root portions 81e and 82f of the holes 81d and 82d of the display screen support member 81 and the base support members 82 rotated around the upper and lower end surfaces 83b and 83c of the support shafts 83 respectively. Therefore, the display body 10 can be smoothly rotated.

According to this embodiment, the display screen support member 81 is provided with the pair of sectorial holes 81d, the sectorial holes 82d of the base support members 82 are provided correspondingly to the pair of holes 81d of the display screen support member 81 respectively, and the plate-shaped support shafts 83 are provided correspondingly to the combinations of the sectorial holes 81d and 82d respectively. The pair of support shafts 83 pass through the sectorial holes 81*d* and 82*d* in the combinations respectively so that the display body 10 can be rotated downward (frontward) (along arrow D) or upward (rearward) (along arrow C) in the state supported through the pair of rotating shafts (the two support shafts 83), whereby the display body 10 can be stably rotated in the vertical direction (anteroposterior direction) also when the same has a large size and a heavy weight.

Although the present invention has been described and illustrated in detail, it is clearly understood that the same is by way of illustration and example only and is not to be taken by way of limitation, the spirit and scope of the present invention being limited only by the terms of the appended claims.

For example, while the display screen turning apparatus 20 is provided on the liquid crystal television 100 employed as an exemplary display in the aforementioned embodiment, the present invention is not restricted to this but the display screen turning apparatus 20 may alternatively be provided on another type of display having a display screen (display panel) such as an organic EL panel other than a liquid crystal display panel.

While the support shafts 83 have rectangular sections in the aforementioned embodiment, the present invention is not restricted to this but the upper and lower end surfaces 83*b* and 83*c* of the support shafts 83 may alternatively have semicircular sections, and the root portions 81*e* and 82*g* of the holes 81*d* and 82*d* of the display screen support member 81 and the base support members 82 may alternatively have semicircular shapes. According to this modification, the upper and lower end surfaces 83*b* and 83*c* of the support shafts 83 can smoothly slide with the root portions 81*e* and 82*g* of the holes 81*d* and 82*d* respectively, whereby the display body 10 can be more smoothly rotated.

While the side surfaces 83*a* of the plate-shaped support shafts 83 inserted into the sectorial holes 81*d* are inclined by about 30° with respect to the vertical direction when the display body 10 is vertically arranged with respect to the horizontal plane along with the display screen support member 81 in the aforementioned embodiment, the present invention is not restricted to this but the holes 82*d* of the base support members 82 may alternatively be so formed as to incline the side surfaces 83*a* of the plate-shaped support shafts 83 inserted into the holes 81*d* by another prescribed angle (45°, for example) other than 30° with respect to the vertical direction.

While the display screen support mechanism 80 is formed by rotatably combining the pair of base support members 82 and the corresponding pair of rotating portions 81*b* provided on the display screen support member 81 with each other through the two support shafts 83 in the aforementioned embodiment, the present invention is not restricted to this but a single support shaft may alternatively pass through the pair of base support members 82 and the pair of rotating portions 81*b* provided on the display screen support member 81. According to this modification, the pair of rotating portions 81*b* provided on the display screen support member 81 are synchronously rotated around the upper end surface (83*b*), serving as the rotation center, of the single support shaft, whereby the display body 10 can be more stably rotated.

What is claimed is:

1. A display screen turning apparatus comprising:
   a plate-shaped support shaft;
   a display screen support member, including a sectorial first hole receiving said plate-shaped support shaft, provided on a side of a display screen and rotatable around a first end, serving as a rotation center, of said plate-shaped support shaft; and
   a base support member, including a sectorial second hole receiving said plate-shaped support shaft, provided on a side of a base, wherein
   a first root portion of said sectorial first hole closer to a center of a circle is arranged on the upper side of said sectorial first hole,
   a second root portion of said sectorial second hole closer to a center of a circle is arranged on the lower side of said sectorial second hole, and
   a first side surface of said plate-shaped support shaft inserted into said sectorial first hole is inclined by a prescribed angle with respect to a vertical direction to come into contact with a first inner side edge of said sectorial second hole of said base support member when said display screen is vertically arranged with respect to a horizontal plane along with said display screen support member.

2. The display screen turning apparatus according to claim 1, wherein
   said first root portion of said sectorial first hole of said display screen support member is rotated around said first end of said plate-shaped support shaft from the state where said display screen is vertically arranged with respect to said horizontal plane along with said display screen support member thereby rotating said display screen rearward by a first prescribed angle.

3. The display screen turning apparatus according to claim 1, wherein
   said plate-shaped support shaft is inclined by said prescribed angle from said vertical direction in a state where said display screen is vertically arranged so that said first side surface of said plate-shaped support shaft is pressed to come into contact with said first inner side edge of said sectorial second hole of said base support member due to a component, perpendicular to said first side surface of said plate-shaped support shaft, included in a vertical load resulting from the own weight of said display screen.

4. The display screen turning apparatus according to claim 1, wherein
   said plate-shaped support shaft includes said first end formed in a direction perpendicular to the thickness direction and a second end formed on a side opposite to said first end, and
   said plate-shaped support shaft is inclined by said first prescribed angle from said vertical direction in the state where said display screen is vertically arranged so that said second end of said plate-shaped support shaft is pressed to come into contact with said second root portion of said sectorial second hole of said base support member due to a component, in a direction along said first side surface of said plate-shaped support shaft, included in a vertical load resulting from the own weight of said display screen.

5. The display screen turning apparatus according to claim 4, wherein
   said plate-shaped support shaft receives the own weight of said display screen on said second end.

6. The display screen turning apparatus according to claim 1, wherein
   a line segment connecting said first root portion of said sectorial first hole of said display screen closer to the center of said circle and said second root portion of said sectorial second hole of said base support member closer to the center of said circle is inclined by said first prescribed angle with respect to said vertical direction when said display screen is vertically arranged with respect to said horizontal plane along with said display screen support member.

7. The display screen turning apparatus according to claim 1, wherein
said plate-shaped support shaft includes said first end formed in a direction perpendicular to the thickness direction and a second end formed on a side opposite to said first end, and
said plate-shaped support shaft is kept in a state where said first end and said second end are held by said first root portion of said sectorial first hole of said display screen support member and said second root portion of said sectorial second hole of said base support member respectively.

8. The display screen turning apparatus according to claim 1, wherein
said display screen is so formed that said first root portion of said sectorial first hole of said display screen support member is rotated frontward or rearward around said first end, serving as the rotation center, of said plate-shaped support shaft until said first side surface of said plate-shaped support shaft or a second side surface opposite to said first side surface in the thickness direction comes into contact with the inner side edge of said sectorial first hole of said display screen support member.

9. The display screen turning apparatus according to claim 2, wherein
said display screen is rotated rearward by said first prescribed angle along with said display screen support member from the state where said first root portion of said sectorial first hole of said display screen support member is rotated around said first end, serving as the rotation center, of said plate-shaped support shaft and thereafter so switched that said second end of said plate-shaped support shaft is rotated around said second root portion, serving as the rotation center, of said sectorial second hole of said base support member to be further rotated rearward by a second prescribed angle.

10. The display screen turning apparatus according to claim 9, wherein
said plate-shaped support shaft is rotated around said second end, serving as the rotation center, of said plate-shaped support shaft inside said sectorial second hole of said base support member when said display screen is rotated by said second prescribed angle along with said display screen support member, so that said display screen is rotated along with said display screen support member.

11. The display screen turning apparatus according to claim 9, wherein
said display screen is rotated rearward by said first prescribed angle and said second prescribed angle to a state arranged substantially parallelly to said horizontal plane from the state vertically arranged with respect to said horizontal plane along with said display screen support member.

12. The display screen turning apparatus according to claim 9, wherein
said display screen support member is rotated in a state where an arcuate portion of said sectorial first hole of said display screen support member is not in contact with said second end of said plate-shaped support shaft when said display screen is rotated by said first prescribed angle, and
said plate-shaped support shaft is rotated with said display screen support member in a state where an arcuate portion of said sectorial second hole of said base support member is not in contact with said first end of said plate-shaped support shaft when said display screen is rotated by said second prescribed angle.

13. The display screen turning apparatus according to claim 12, wherein
the radial lengths of said sectorial first hole and said sectorial second hole are larger than a radial width of said plate-shaped support shaft respectively.

14. The display screen turning apparatus according to claim 1, wherein
a thickness of said plate-shaped support shaft and the widths of said first root portion of said sectorial first hole and said second root portion of said sectorial second hole in the thickness direction of said support shaft are substantially equal to each other.

15. The display screen turning apparatus according to claim 1, wherein
said display screen support member is provided with a pair of said sectorial first holes and said base support member is provided with a pair of said sectorial second holes respectively,
a pair of said plate-shaped support shafts are provided correspondingly to combinations of said pair of sectorial first holes and said pair of sectorial second holes respectively, and
said pair of plate-shaped support shafts pass through said sectorial first holes and said sectorial second holes in said combinations respectively.

* * * * *